(12) United States Patent
Toma et al.

(10) Patent No.: US 10,858,893 B2
(45) Date of Patent: Dec. 8, 2020

(54) LATERALLY MOVABLE MOBILE WELL SERVICING UNITS AND METHODS OF USE

(71) Applicant: Adam Toma, Sherwood Park (CA)

(72) Inventors: Adam Toma, Sherwood Park (CA); Francis Yuzyk, Sherwood Park (CA); Vladimir Walter Lacika, Sherwood Park (CA)

(73) Assignee: Adam Toma, Sherwood Park (CA)

( * ) Notice: Subject to any disclaimer, the term of this patent is extended or adjusted under 35 U.S.C. 154(b) by 137 days.

(21) Appl. No.: 15/887,450

(22) Filed: Feb. 2, 2018

(65) Prior Publication Data

US 2019/0242194 A1 Aug. 8, 2019

(51) Int. Cl.
| | |
|---|---|
| *E21B 15/00* | (2006.01) |
| *B62D 55/084* | (2006.01) |
| *B62D 55/02* | (2006.01) |
| *B62D 39/00* | (2006.01) |
| *B62D 55/04* | (2006.01) |

(52) U.S. Cl.
CPC .............. *E21B 15/00* (2013.01); *B62D 39/00* (2013.01); *B62D 55/02* (2013.01); *B62D 55/04* (2013.01); *B62D 55/084* (2013.01)

(58) Field of Classification Search
CPC ...... B62D 39/00; B62D 55/02; B62D 55/084; E21B 15/00
USPC ........................................................ 180/200
See application file for complete search history.

(56) References Cited

U.S. PATENT DOCUMENTS

| | | | |
|---|---|---|---|
| 1,146,094 A | 7/1915 | Parr | |
| 2,220,155 A | 11/1940 | Jachim | |
| 2,272,349 A | 2/1942 | Noser | |
| 2,296,659 A | 9/1942 | Bates et al. | |
| 2,362,170 A | 11/1944 | Swaisgood | |
| 2,469,087 A | 5/1949 | Clark | |
| 2,692,169 A | 10/1954 | Phillips | |
| 2,762,659 A | 9/1956 | Harlan et al. | |
| 3,000,473 A | 9/1961 | Reynolds | |
| 3,017,968 A | 1/1962 | McMahon | |

(Continued)

FOREIGN PATENT DOCUMENTS

| | | |
|---|---|---|
| CA | 2279686 | 2/2001 |
| CA | 2699556 | 5/2011 |

(Continued)

OTHER PUBLICATIONS

Work Platform set up instructions, HD Energy Rentals Ltd., URL= http://www.hdenergyrentals.com/, published at least as early as Sep. 1, 2014, 2 pages.

(Continued)

*Primary Examiner* — Tony H Winner
*Assistant Examiner* — Felicia L. Brittman
(74) *Attorney, Agent, or Firm* — Robert A. Nissen

(57) ABSTRACT

A mobile well service unit has a structural frame with a front end and a rear end, and defining an axis between the front end and the rear end; a platform mounted at the front end or the rear end of the structural frame and configured to move up and down relative to the structural frame; and ground engaging members mounted to the structural frame and configured to permit the mobile well service unit to move laterally, relative to the axis, across a ground surface. A method of use involves translating the unit laterally.

30 Claims, 10 Drawing Sheets

(56) References Cited

U.S. PATENT DOCUMENTS

| | | | |
|---|---|---|---|
| 3,126,112 | A | 3/1964 | Shaw et al. |
| 3,259,207 | A | 7/1966 | Schoeffler |
| 3,360,078 | A | 12/1967 | Hopfeld |
| 3,429,398 | A | 2/1969 | Reynolds et al. |
| 3,664,456 | A | 5/1972 | Smith, Sr. et al. |
| 3,752,261 | A | 8/1973 | Bushnell |
| 3,871,478 | A | 3/1975 | Bushnell, Jr. |
| 3,970,171 | A | 7/1976 | Honecker et al. |
| 4,357,994 | A | 11/1982 | Hall |
| 4,440,262 | A | 4/1984 | Hunt et al. |
| 4,468,904 | A | 9/1984 | O'Malley |
| 4,565,262 | A | 1/1986 | Hawkins |
| 4,683,988 | A | 8/1987 | Shrum, Jr. |
| 5,533,593 | A | 7/1996 | Huang |
| 6,189,653 | B1 | 2/2001 | Laug |
| 6,343,892 | B1 | 2/2002 | Kristiansen |
| 6,431,314 | B1 | 8/2002 | Boulanger et al. |
| 7,293,607 | B2 | 11/2007 | Lambert et al. |
| 7,469,749 | B2 | 12/2008 | Folk |
| 7,836,536 | B2 | 11/2010 | Motohashi et al. |
| 7,874,544 | B2 | 1/2011 | Monroe |
| 8,235,126 | B2 | 8/2012 | Colter |
| 8,584,802 | B2 | 11/2013 | Earl et al. |
| 8,622,173 | B2 | 1/2014 | Fuqua et al. |
| 8,678,135 | B2 | 3/2014 | Crook et al. |
| 9,260,916 | B1 | 2/2016 | Brotherton |
| 9,587,434 | B2 | 3/2017 | Frick |
| 9,878,889 | B2 | 1/2018 | Watson et al. |
| 2004/0035636 | A1 | 2/2004 | Julien |
| 2005/0056484 | A1 | 3/2005 | Fredette |
| 2007/0051559 | A1 | 3/2007 | Brown et al. |
| 2008/0038093 | A1 | 2/2008 | Lambert et al. |
| 2009/0301813 | A1 | 12/2009 | Chantelois et al. |
| 2010/0244404 | A1 | 9/2010 | Bradley |
| 2013/0161128 | A1 | 6/2013 | Watson et al. |
| 2013/0240297 | A1 | 9/2013 | Aquino et al. |
| 2013/0240687 | A1 | 9/2013 | Mosier |
| 2014/0041963 | A1 | 2/2014 | O'Shea |
| 2014/0138081 | A1* | 5/2014 | Yorga ............... E21B 19/14 166/85.5 |
| 2015/0034418 | A1 | 2/2015 | Melton et al. |
| 2016/0362284 | A1 | 12/2016 | Haessler et al. |
| 2017/0283010 | A1 | 10/2017 | Dishon |
| 2017/0283229 | A1 | 10/2017 | Shi |
| 2018/0119432 | A1 | 5/2018 | Finlay et al. |

FOREIGN PATENT DOCUMENTS

| | | | |
|---|---|---|---|
| CA | 2726088 | | 6/2012 |
| CN | 102874725 | A * | 1/2013 |
| CN | 202864853 | | 4/2013 |
| CN | 106536401 | | 3/2017 |
| GB | 410193 | | 5/1934 |
| GB | 1403760 | | 8/1975 |
| GB | 2116236 | | 9/1983 |
| KR | 20120134198 | | 12/2012 |
| NL | 1041096 | | 8/2015 |

OTHER PUBLICATIONS 4 adjustable working decks c/w handrails, Lamb's Trucking Ltd., URL=http://www.lambstrucking.com/, published at least as early as Dec. 17, 2015, 4 pages.

AMLOK Rod Locks Are Pneumatic and Hydraulic Locking Clamps, Advanced Machine & Engineering Co., URL=http://www.ame.com/, published at least as early as Sep. 2, 2014, 1 page.

Colter WASP, Colter Energy LP, published at least as early as Sep. 5, 2014 and Sep. 6, 2014, accessed on and screenshots taken on Oct. 12, 2018, URL=https://web.archive.org/web/20140906053345/http://colterenergy.com/wasp.php, 5 pages.

Photograph taken at least as early Jul. 28, 2014.

Photograph taken at least as early Sep. 1, 2014.

Screenshot Athena 850 Bi-levelling Scissor Lift, URL=https://www.youtube.com/watch?v=GJDTTuZ1HWM, published as early as Nov. 24, 2016, 4 pages.

OMNI Scissor Lift, Man Lift Mfg. Co., URL=https://www.youtube.com/watch?v=lbSkfBZjnxc, published as early as Jun. 24, 2013, 4 pages.

Articulating Boom Lift 30' Electric, United Rentals, believed to be available as early as Feb. 2, 2018, 1 page.

\* cited by examiner

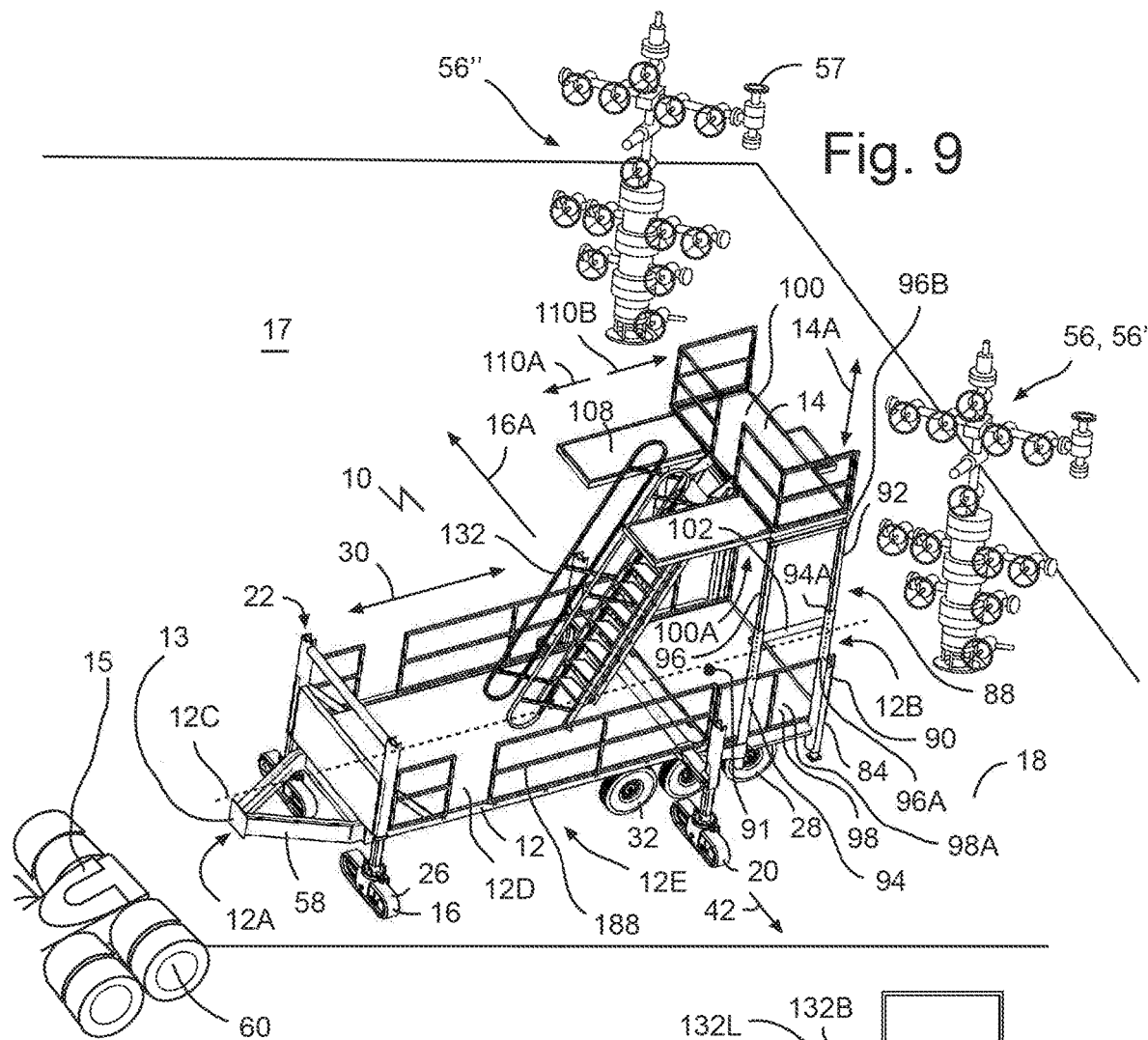
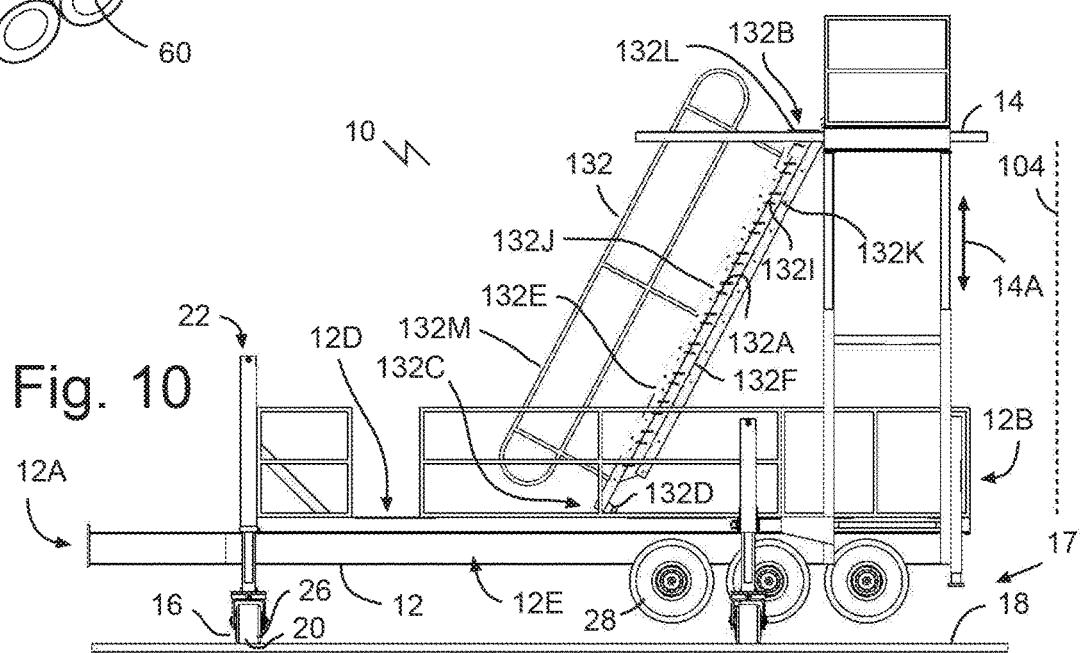

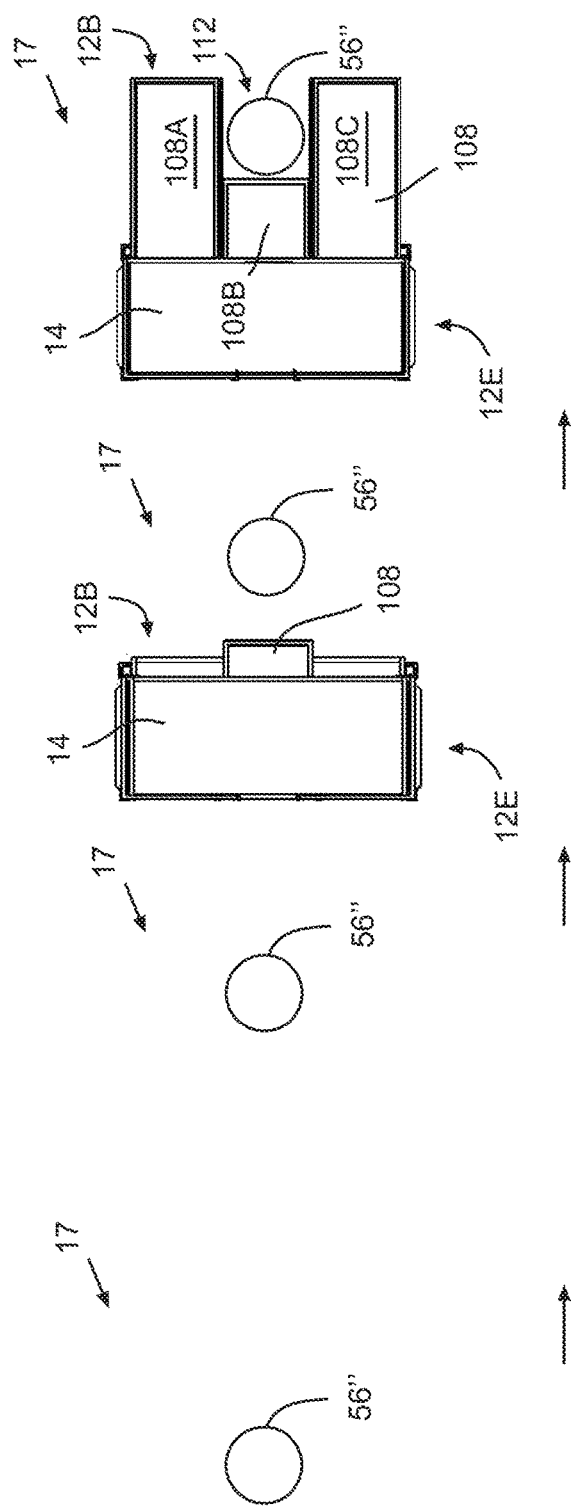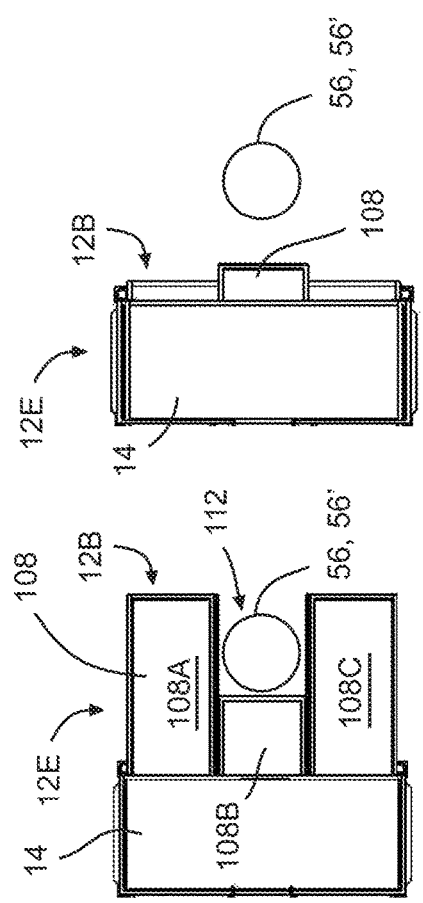

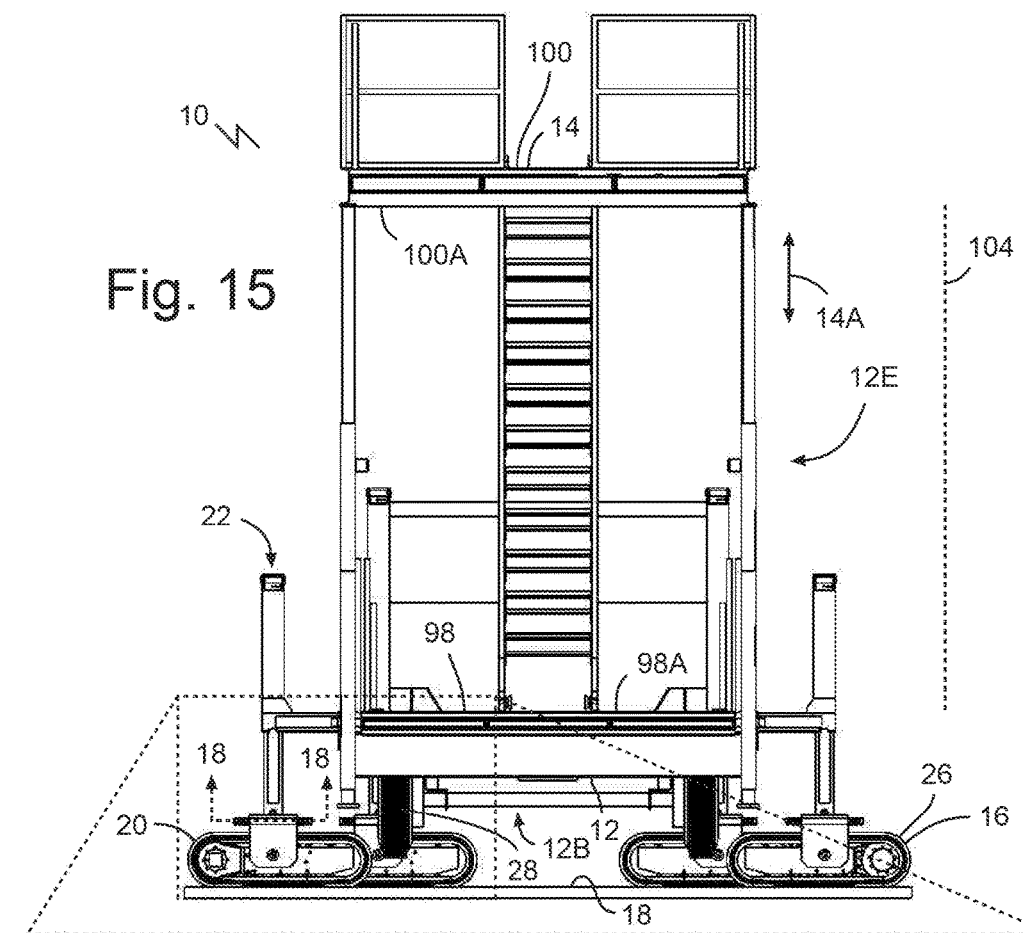
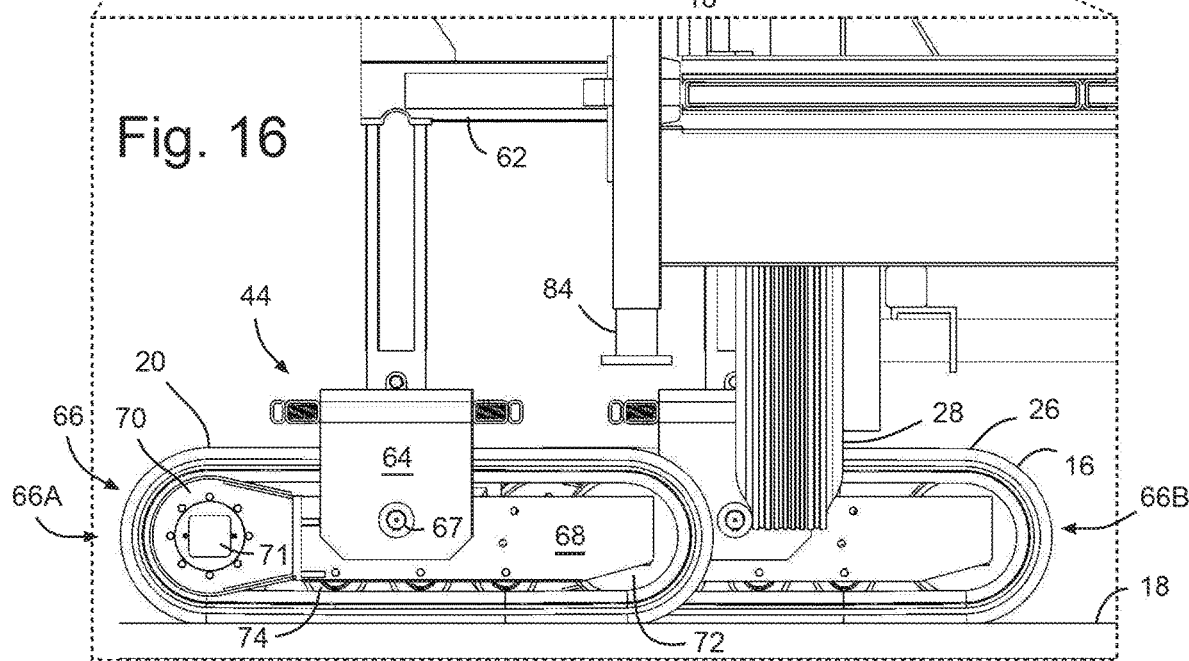

LATERALLY MOVABLE MOBILE WELL SERVICING UNITS AND METHODS OF USE

TECHNICAL FIELD

This document relates to laterally movable mobile well servicing units and related methods of use.

BACKGROUND

A well site may locate one or more wells within a complex arrangement of equipment, infrastructure, and vehicles. Plural wells are often located on a pad, which may be constructed from rig mats, concrete, or other materials. An individual well at a well site may require servicing at any stage of operation, for example during exploration, completion, production, or abandonment. In a typical well servicing method a tractor unit backs up a wheeled trailer until the trailer is located adjacent the well. A platform on the trailer may then be raised or lowered to a desired height to permit personnel to access various sections of the wellhead assembly as needed for well servicing. The presence of infrastructure, equipment, and vehicles may obstruct the path of the trailer to the well, making it difficult to maneuver the trailer into the desired position. In some cases plural wells may require servicing at a multi-well pad. Plural wells may be serviced using plural trailers, each positioned adjacent a respective well. A single trailer may also be used to service plural wells one by one in series, starting by positioning the trailer adjacent a well, servicing the well, using the tractor unit to reposition the trailer adjacent a subsequent well, servicing the subsequent well, and continuing until all wells are serviced as desired.

SUMMARY

A mobile well service unit is disclosed comprising: a structural frame with a front end and a rear end, and defining an axis between the front end and the rear end; a platform mounted at the front end or the rear end of the structural frame and configured to move up and down relative to the structural frame; and ground engaging members mounted to the structural frame and configured to permit the mobile well service unit to move laterally, relative to the axis, across a ground surface.

A method is disclosed comprising using the mobile well service unit to service an oil or gas well.

A method is disclosed comprising: positioning a mobile well service unit adjacent a first oil or gas well, the mobile well service unit comprising a structural frame with a platform mounted at an end of the structural frame adjacent to the first oil or gas well, the platform configured to move up and down relative to the structural frame; and moving, for example translating, the mobile well service unit laterally across a ground surface from the first oil or gas well to a second oil or gas well.

A trailer or skid is disclosed that mounts a platform that can be raised or lowered, and that has ground engaging elements (such as tracks or wheels) that permit sideways movement of the trailer or skid relative to an axis of the trailer or skid.

A trailer or skid is disclosed in which the trailer or skid has a) first ground engaging elements (such as wheels for a trailer or beams for a skid) that mount the platform, and b) second ground engaging elements that can be steered to drive the trailer or skid sideways.

A trailer or skid is disclosed in which the first ground engaging elements are motorized wheels to provide forward/backward movement, and b) the second ground engaging elements are motorized to provide sideways movement, respectively.

A trailer or skid is disclosed in which the second ground engaging elements are outriggers that can lift the first ground engaging elements off of the ground, and are motorized to provide sideways movement.

A trailer or skid is disclosed provided as an oilfield production well servicing rig, to permit the rig to move sideways to travel between adjacent wells.

In various embodiments, there may be included any one or more of the following features: The ground engaging members comprise continuous tracks. The ground engaging members are configured to move, relative to the structural frame, between: a raised stowed position, where the ground engaging members out of contact with the ground; and a lowered deployed position, where the ground engaging members contact the ground surface. Each of the ground engaging members comprises an actuator connected to move the ground engaging member between the raised stowed position and the lowered deployed position. The actuator comprises a hydraulic cylinder. The ground engaging members are a first set of ground engaging members, and further comprising: a second set of ground engaging members mounted to the structural frame and configured to permit the mobile well service unit to move in a direction parallel to the axis. The second set of ground engaging members are configured to be: in contact with the ground surface when the first set of ground engaging members are in the raised stowed position; and raised above and out of contact with the ground surface when the first set of ground engaging members are in the lowered deployed position. The ground engaging members are a first set of ground engaging members, and further comprising: a second set of ground engaging members mounted to the structural frame and configured to permit the mobile well service unit to move in a direction parallel to the axis. The second set of ground engaging members comprise wheels. The structural frame comprises a trailer chassis configured to be towed by a truck. The structural frame comprises a ground-engaging skid. The ground engaging members are configured to move laterally outward, relative to a center of gravity of the mobile well service unit, between a laterally extended position and a laterally retracted position. Each of the ground engaging members comprises an actuator connected to move the ground engaging member between the laterally extended position and the laterally retracted position. The actuator comprises a hydraulic cylinder. The ground engaging members are configured to be steered about a range of two or more angular positions. The range of two or more angular positions include: a first position where the ground engaging members point in an axial direction; and a second position where the ground engaging members point in a lateral direction relative to the axis. The ground engaging members comprise continuous tracks and in which the ground engaging members are configured to move, relative to the structural frame, between: a raised stowed position, where the ground engaging members out of contact with the ground and are in the first position; and a lowered deployed position, where the ground engaging members contact the ground surface and are in the second position. In which, for each ground engaging member, the range of two or more angular positions include a plurality of positions where the ground engaging member points in different respective lateral directions relative to the axis. The ground engaging members each comprise an angular locking system to lock the ground engaging member in a selected angular position of the range of two or more angular positions. The angular locking system comprises: a locking part; a first part supporting the locking part and connected to the respective ground engaging member; and a second part connected to the structural frame, the first part being mounted to rotate relative to the second part to define the range of two or more angular positions, the second part defining a plurality of slots that align to receive the locking part in different respective angular positions relative to the first part. In which: the first part comprises a collar; the second part comprises a collar or disc nested within the first part; and the locking part comprises a pin biased to advance into contact with the second part. In which the platform comprises floor panels mounted to move between an extended position and a retracted position toward or away from an oil or gas well adjacent the platform in use. Using the ground engaging members to move the mobile well service unit laterally across the ground surface from a first oil or gas well to a second oil or gas well. In which moving is carried out using continuous tracks. In which: moving is carried out using a first set of ground engaging members; and positioning is carried out using a second set of ground engaging members to advance the end of the structural frame toward the first oil or gas well. In which: during moving the second set of ground engaging members are out of contact with a ground surface; and during positioning the first set of ground engaging members are out of contact with the ground surface. The structural frame comprises a trailer chassis; the second set of ground engaging members comprise wheels; the end of the structural frame is a rear end; and positioning comprises backing the trailer chassis using a truck connected to a front end of the structural frame until the rear end is adjacent the first oil or gas well. After moving the mobile well service unit to the second oil or gas well, towing the trailer chassis away from the second oil or gas well. Servicing the first oil or gas well and the second oil or gas well using the mobile well service unit. Prior to, during, or after positioning, extending floor panels of the platform into an extended position to facilitate access to the first oil or gas well; prior to moving, retracting the floor panels into a retracted position; and prior to, during, or after moving, extending the floor panels of the platform into the extended position to facilitate access to the second oil or gas well.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 9 is a perspective view illustrating a method of translating the mobile well service unit of FIG. 1 laterally across a ground surface from a first oil or gas well to a second oil or gas well with the ground engaging members in a lowered deployed position, and the platform in a raised position.

FIG. 10 is a side elevation view of the mobile well service unit of FIG. 9.

FIGS. 11-14 are a series of top plan views illustrating a method of servicing plural wells with the mobile well service unit of FIG. 1.

FIG. 15 is a rear elevation view of the mobile well service unit of FIG. 9.

FIG. 16 is an exploded view of the area delineated by dashed lines in FIG. 15.

DETAILED DESCRIPTION

Immaterial modifications may be made to the embodiments described here without departing from what is covered by the claims.

Oil or gas wells may require servicing during the lifetime of the wellbore, for example to maintain and/or increase production such as by acidizing or fracturing the formation, perform testing on the formation or the wellbore integrity, replace components such as sucker rods or production tubing or casing, or to perform a variety of other suitable operations. Slickline, coiled tubing, snubbing and workover rigs or rod units may be used in well service activities. Well servicing includes the maintenance procedures performed on an oil or gas well after the well has been completed and production from the reservoir has begun. Well servicing may also include operations on the well during exploration and completion.

Well service rigs are generally mobile or portable rigs, for example having a transportable platform mounted on a chassis or undercarriage. Such rigs may be powered by a propulsion system for moving the rig from wellsite to wellsite. Unlike drilling rigs, service rigs may return to a particular well many times. The rig may be a mobile truck, for example with a derrick and a cab for one driver, or trailer-mounted, enabling it to be towed behind a prime mover, such as a tractor unit, also called a semi-truck. Traditionally, trailer-mounted service rigs are larger and heavier, with greater capacities relative to rigs that integrate a truck with a servicing platform. Service rigs may be capable of carrying a significant amount of weight given the diverse equipment mounted thereon and must also be able to meet regulations governed by road bans to permit servicing of wellbores throughout the year and under a variety of environmental condition. A rig crew may use the equipment on the rig to perform a variety of services, including completions, work-overs, abandonments, well maintenance, high-pressure and critical sour-well work, and re-entry preparation, as well as other operations.

Well servicing may require performance of work at elevated locations, manipulation of heavy equipment, and/or positioning of workers at various positions about the work structures, such as the wellhead, while ensuring worker safety at various heights. Service rigs may have a work platform that may be elevated from the level of its support base, for example to provide ease of worker access to various parts of the structure on demand. In some cases, the rig may incorporate a derrick to mount the platform. Once secured on location, the derrick may be elevated to a standing position with the use of hydraulics. After that, the rest of the rig may be assembled and the service process initiated.

Figure 1:
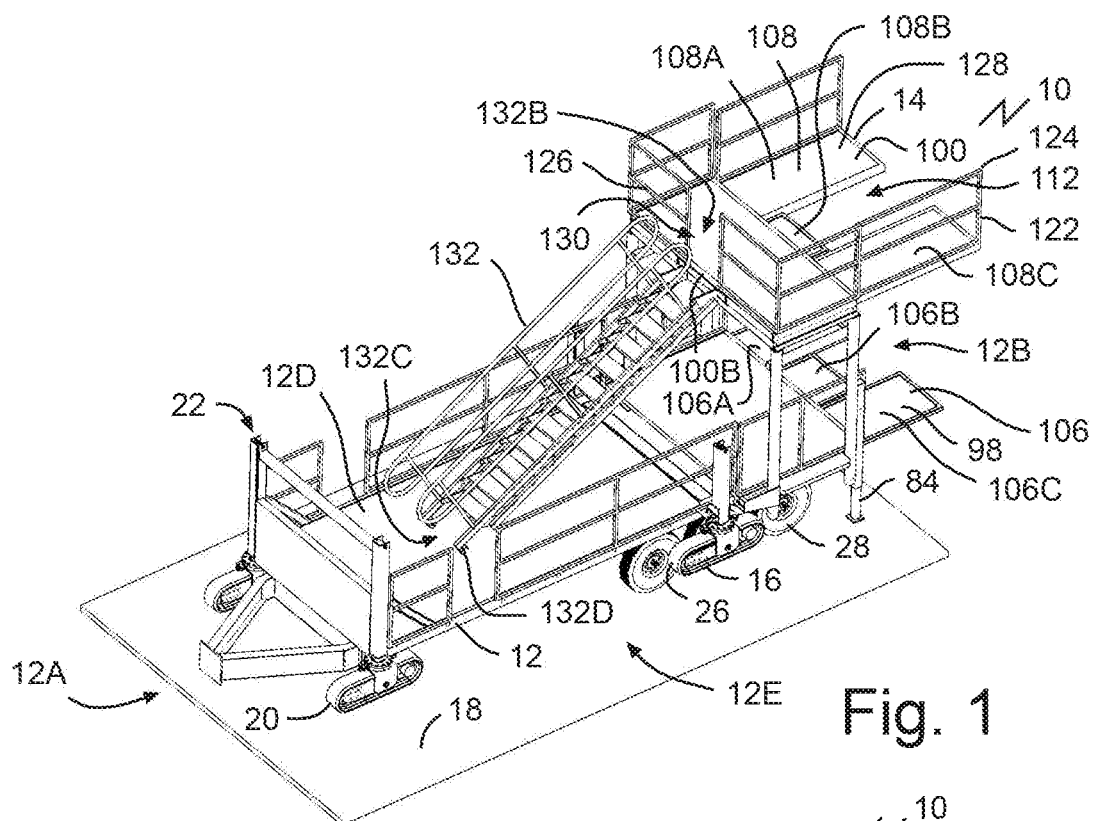
FIG. 1 is a perspective view of a mobile well service unit with ground engaging members in a raised stowed position.
Figure 2:
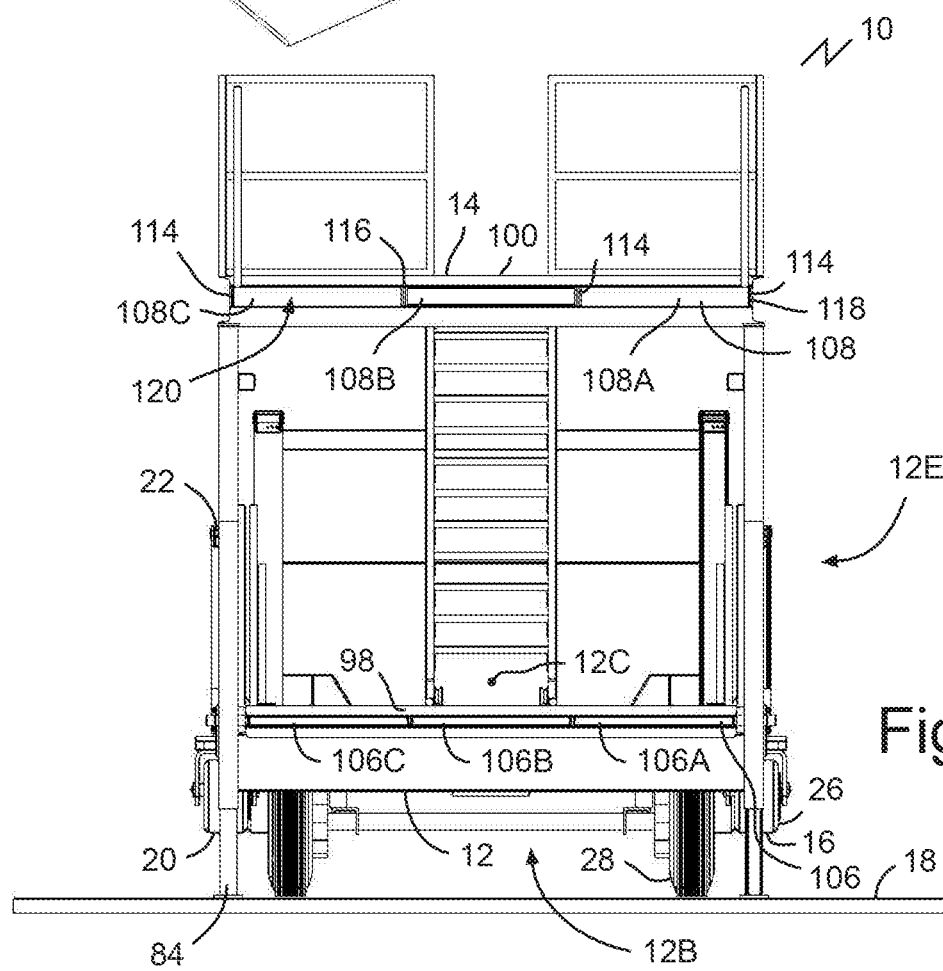
FIG. 2 is a rear elevation view of the mobile well service unit of FIG. 1 with ground engaging members in the raised stowed position.
Figure 3:
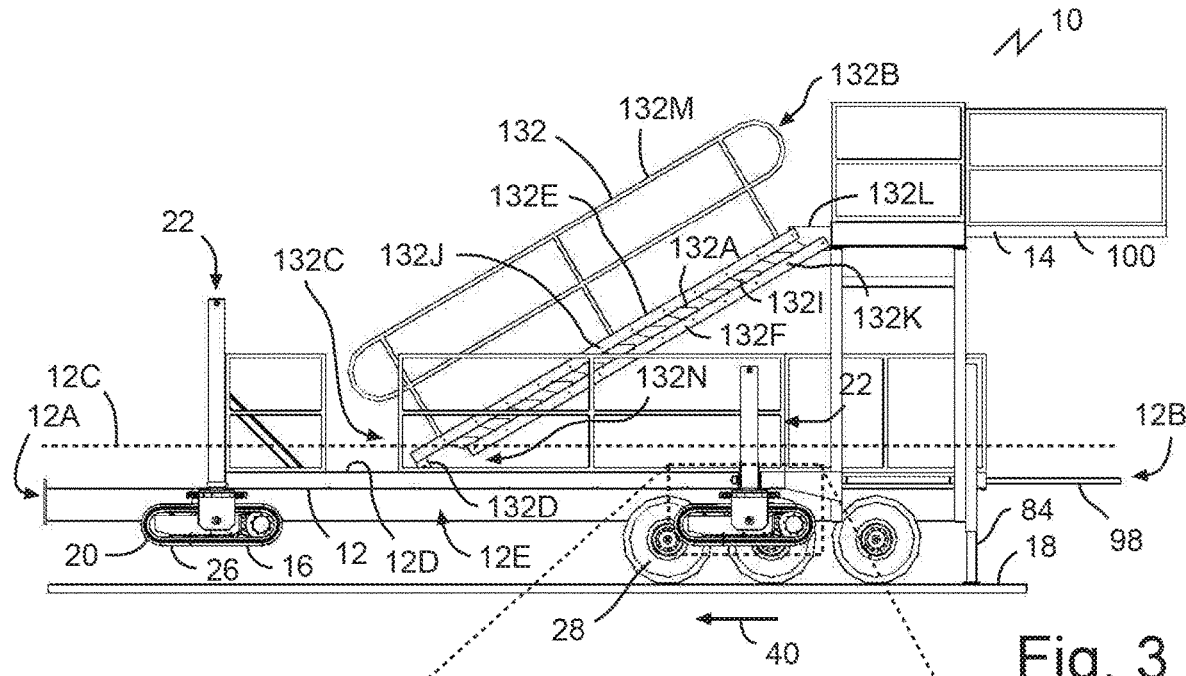
FIG. 3 is a side elevation view of the mobile well service unit of FIG. 1 with ground engaging members in the raised stowed position.
Figure 7:
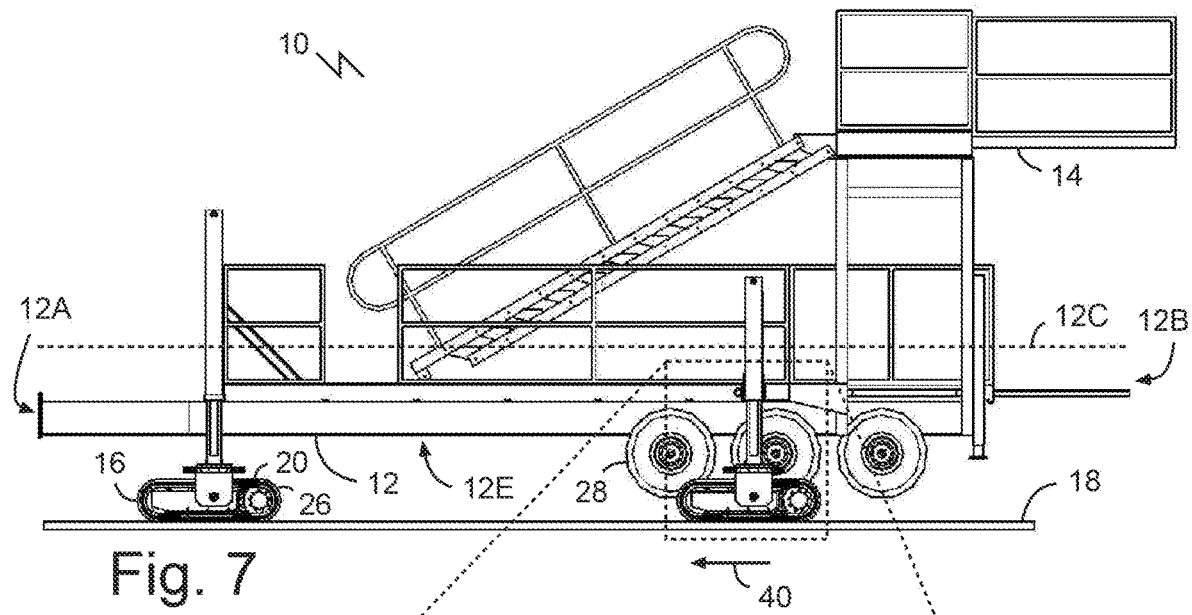
FIG. 7 is a side elevation view of the mobile well service unit of FIG. 5.

Referring to FIGS. 1-3, 5-7, 9-10, and 15, a mobile well service unit 10 is illustrated comprising a structural frame 12, a platform 14, and ground engaging members 16. Referring to FIGS. 3, 7, and 9, the structural frame 12 may have a front end 12A and a rear end 12B, and may define an axis 12C between the front end 12A and the rear end 12B. Referring to FIGS. 1, 3, 5, 7, and 9-10, at least during servicing, the platform 14 may be mounted at, for example adjacent or near, the front end 12A or the rear end 12B of the structural frame 12. The mobile well service unit 10 may be used to service an oil or gas well 56. Various parts of the unit 10 may be configured to move relative to the other parts of the unit. Referring to FIGS. 9, 10, and 15, the platform 14 may be configured to move up and down, for example in directions 14A, relative to the structural frame 12. The ground engaging members 16 may be mounted to the structural frame 12. The members 16 may be configured to move one or more of side to side, up and down, and rotate about an axis relative to the frame 12.

Referring to FIG. 9, the frame 12 may have a structure suitable for being transported to and from a well site 17. For example the unit 10 may form a trailer, which may in use be towed to a desired location. The structural frame 12 may comprise a trailer chassis 58 configured to be towed by a tractor unit such as a truck 60. The trailer may form a gooseneck trailer, which may have a coupler 13 adapted to mate with and be towed by a fifth wheel hitch 15. Other suitable connection methods may be used. A ball and hitch coupling may be used. In other cases the unit 10 may be integrally connected to a prime mover, such as in the case where the unit 10 has a portion that forms a truck, with an engine, drivetrain, and associated control, cab, and other components, and the unit has another portion that locates the platform 14. In some cases the structural frame 12 comprises a ground-engaging skid. A skid-mounted unit may be adapted to be transported on a separate trailer or other unit. Referring to FIGS. 1-3 and 9, the structural frame 12 may comprise a plurality of landing gear or outriggers 84, for example for stabilizing the structural frame 12. Outriggers 84 may be moved laterally outward relative to center of gravity 91 of the unit 10. Referring to FIG. 9, the chassis 58 may have end and side railings 188, for example to enhance worker safety.

Referring to FIG. 9, the ground engaging members 16 may be configured to permit the mobile well service unit 10 to move laterally, for example in a direction 16A, relative to the axis 12C, across a ground surface 18. The ground engaging members 16 may comprise parts, such as continuous tracks 20 or other parts, suitable for permitting lateral movement of the mobile well service unit 10, for example in the direction 16A and 42. The ground engaging members 16 may be used to translate the mobile well service unit 10 laterally, for example in the direction 16A, across the ground surface 18 from a first oil or gas well 56' to a second oil or gas well 56". The ability to move the unit 10 laterally may assist in the ability to position or reposition the unit 10 at various locations at the well site. In some cases, the unit 10 may be moved without the assistance or a tractor unit, for example in the cases of a skid or trailer. By contrast, a conventional servicing rig built on a fixed axle wheeled trailer can only be repositioned using a relatively complex series of movements initiated and driven by the tractor unit, and potentially obstructed by the presence of adjacent infrastructure or equipment at the well site.

Referring to FIGS. 1-3, 5-7, 9-10, and 15, the mobile well service unit 10 may have plural sets of ground engaging members 16. Referring to FIG. 9, the ground engaging members 16 may include a first set of ground engaging members 26 and a second set of ground engaging members 28. The different sets of members 26 and 28 may be one or more of mounted, structured, and oriented to perform different functions. For example the members 26 and 28 are structured as different types of ground engaging members, such as tracks 20 in the case of members 26, and wheels 32 in the case of members 28. In other cases the members 26 and 28 are of the same type, for example wheels. In some cases the different sets of members are adapted to move the unit 10 in different directions. For example, the members 28 may be adapted to move the mobile well service unit 10 in a direction 30 parallel to the axis 12C between the front and rear ends 12A and 12B. One or more of the sets of members, such as tracks 20, may be structured to change orientation, for example by one or more of rotating, raising/lowering, or extending/retracting, while the other set of members may be adapted to remain fixed, or otherwise have relatively reduced adjustability, such as in the case of fixed axle trailer wheels 32. In some case plural sets of members may be adjustable in orientation. In some cases the sets of members cooperate with one another to move the unit 10, and in other cases the sets of members work independently of one another in different modes. Some or all of the ground engaging members 16 may be active, for example driven by a motor, while some may be passive, during operation.

Referring to FIGS. 1-3, 5-10 and 15-16, each ground engaging member 16 may have a structure suitable for moving into and out of contact with the ground surface 18. Referring to FIGS. 1-3, 5-7, 9-10, and 15, the ground engaging members 16 may be configured to move, relative to the structural frame 12, between a) a raised stowed position, where the ground engaging members 16 are out of contact with the ground surface 18, for example as illustrated in FIGS. 1-3, and b) a lowered deployed position, where the ground engaging members 16 contact the ground surface 18, for example as illustrated in FIGS. 5-7, 9-10, and 15.

Figure 17:
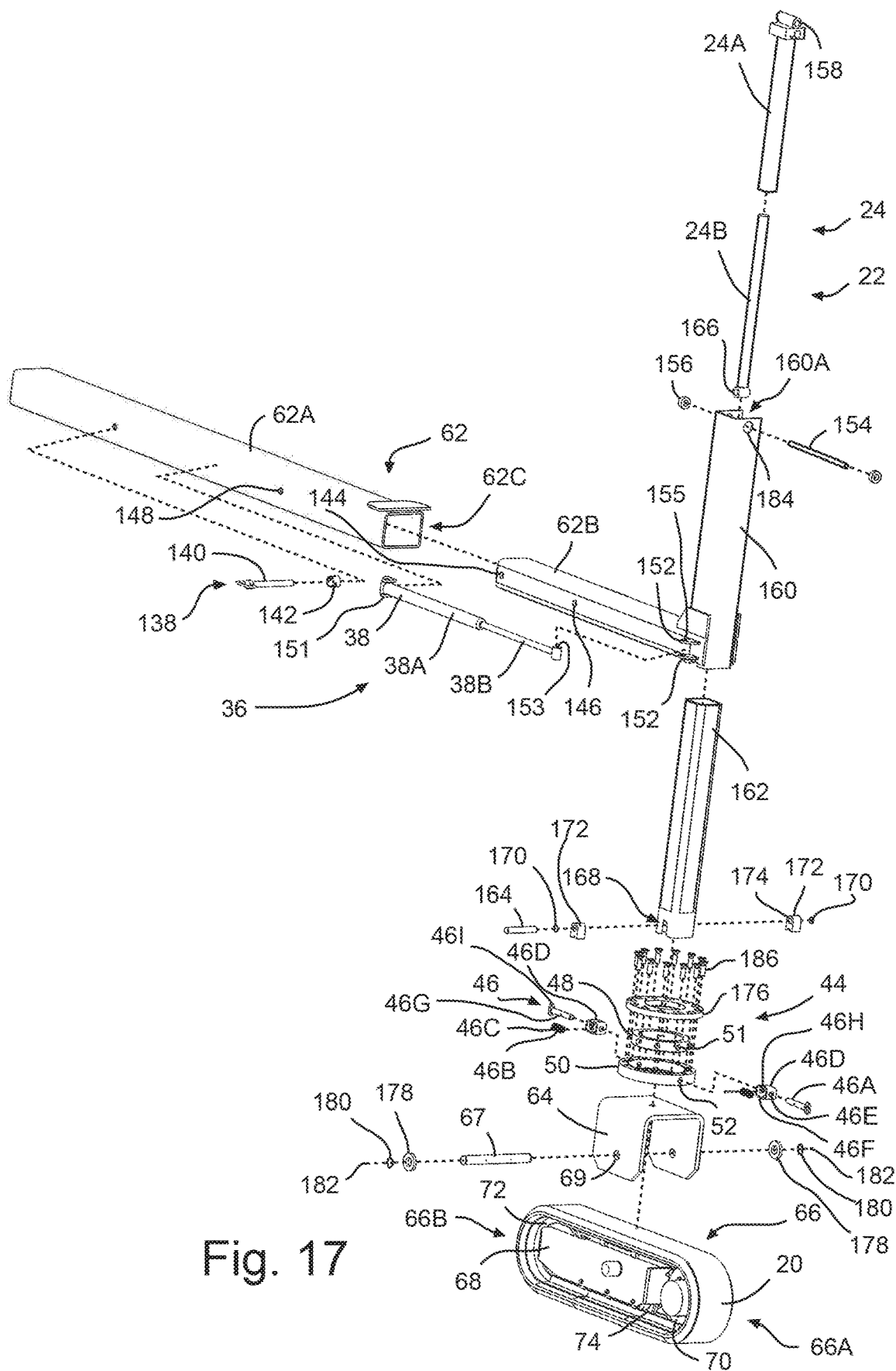
FIG. 17 is an exploded view of a ground engaging member of the mobile well service unit of FIG. 1.

Referring to FIGS. 1-3, 9-10, 15, and 17, each of the ground engaging members 16 may comprise an actuator 22 connected to move the ground engaging member 16 between the raised stowed position and the lowered deployed position. Referring to FIG. 17, the actuator 22 may comprise a hydraulic cylinder 24, for example having a cylindrical barrel or body 24A and a piston rod 24B mounted to extend out of or retract into the body 24A in response to forces applied by pressurized hydraulic fluid. The actuator, such as cylinder 24, may be mounted to cause telescopic action of various parts relative to one another, such as a pair of nested columns 160 and 162. The actuator may be mounted in a suitable fashion to cause the parts to telescope, for example the cylinder 24 may be mounted within the columns 160 and 162 as shown. In other cases cylinder 24 may be mounted to external surfaces of the columns.

The cylinder 24 may be mounted between the members 16 and the frame 12 via a suitable mechanism. The cylinder body 24A may be connected to outer column 160, for example via a pin 154 or other suitable part. The pin 154 may be concurrently received by holes 158 of the cylinder body 24A and holes 184 of the outer column 160. The cylinder body 24A may be positioned within a channel 160A defined by the outer column 160. Bushings 156, or bearings, may be used, for example to mount the pin 154 within holes 184. The piston rod 24B may be connected to inner column 162, for example via a pin 164 or other suitable part. The pin 164 may be concurrently received within holes 166 of the piston rod 24B and holes 174, for example of mounting parts 172. Parts 172 may be mounted in a suitable fashion to the inner column 162, for example within slots or channels 168 defined by the inner column 162. Pin 164 may be mounted to part 172 via a retaining ring 170, bushing, bearing or other suitable part. Holes may refer to slots or channels in some cases. The actuator 22 may be mounted in other configurations, for example on the outside of the columns 160, 162. Actuators in this document other than hydraulic cylinders may be used, for example screw jacks, chain and sprockets, pulleys, and other devices. A lock (not shown) may be used to lock the cylinder in a desired position, for example one or more of the raised and lowered positions.

For all actuators a power source, for example a hydraulic supply and return circuit with a reservoir, pump, lines, and associated controls, may be present. The hydraulic power source may be the same power source used to operate the telescoping platform mast. A control system may be used to bypass one or both the platform raising/lowering, platform extension/retraction, and track drive circuits. Actuators may provide one or more of independent height and lateral extension control.

Referring to FIGS. 1-10 and 15-16, the raising and lowering of the members 26 may cause the members 28 to engage and disengage the ground surface 18 in use. Referring to FIGS. 2 and 3, the ground engaging members 28 may be configured to be in contact with the ground surface 18 when the first set of ground engaging members 26 are in the raised stowed position. While stowed the members 26 may be positioned in a pocket defined by the frame 12. Referring to FIGS. 6-8, 10 and 15-16, ground engaging members 28 may be configured to be raised above and out of contact with the ground surface 18 when the first set of ground engaging members 26 are in the lowered deployed position. By permitting the members 26 to be used to raise the members 28 out of ground contact, the members 26 are free to operate without interference by members 28. Such may be advantageous when members 28 are fixed axle load-bearing transport wheels 32 as shown, and members 26 are used to move the unit 10 laterally relative to a direction of travel defined by the wheels 32.

Referring to FIGS. 2-3, 7 and 9, the ground engaging members 16 may be configured to move laterally outward relative to a center of gravity 91 (FIG. 9) of the unit 10. Referring to FIGS. 1-2, 9, and 15-16, the ground engaging members 16 may be configured to move laterally, relative to the axis 12C (FIG. 9) and the structural frame 12, across the ground surface 18. The movement may be between a laterally extended position, for example as illustrated in FIGS. 9 and 15-16, and a laterally retracted position, for example as illustrated in FIGS. 1-2. Across the ground surface in this document includes moving in and out of contact with the ground surface unless context dictates otherwise. Laterally extending the members 16 prior to moving the unit laterally may increase the stability of the unit 10, in a fashion similar to or in addition to outriggers.

Figure 8:
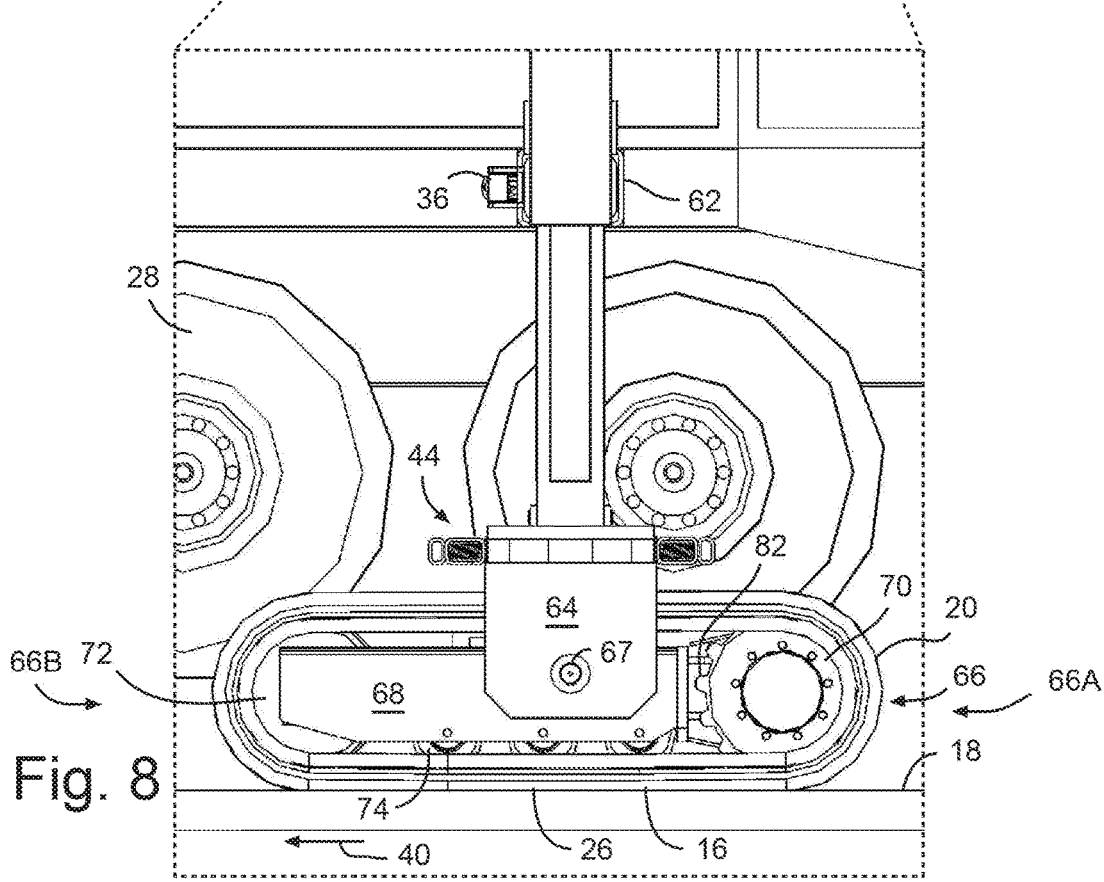
FIG. 8 is a close up view of the area delineated by dashed lines in FIG. 7.

Referring to FIGS. 8 and 17, each of the ground engaging members 16 may comprise an actuator 36 connected to move the ground engaging member 16 between the laterally extended position and the laterally retracted position. Embodiments of actuators 36 may incorporate the same structures and principles of operation as embodiments of actuators 22 and vice versa. Referring to FIG. 17, the actuator 36 may comprise a hydraulic cylinder 38, for example having a cylindrical barrel or body 38A and a piston rod 38B mounted to extend out of and retract into the cylinder body 38A in response to forces applied by pressurized hydraulic fluid. The actuator 36 may be mounted to cause telescopic action of various parts relative to one another, such as a pair of nested columns, such as columns 62A and 62B. The members 16 may be mounted to the frame 12 via respective arms, which include column 62A in the example shown. Stops may be used to prevent over or under extension of columns relative to one another. The actuator may be mounted in a suitable fashion to cause the parts to telescope, for example the cylinder 38 may be mounted to external surfaces of columns 62A and 62B as shown. In other cases cylinder 38 may be mounted within the columns.

Figure 18:
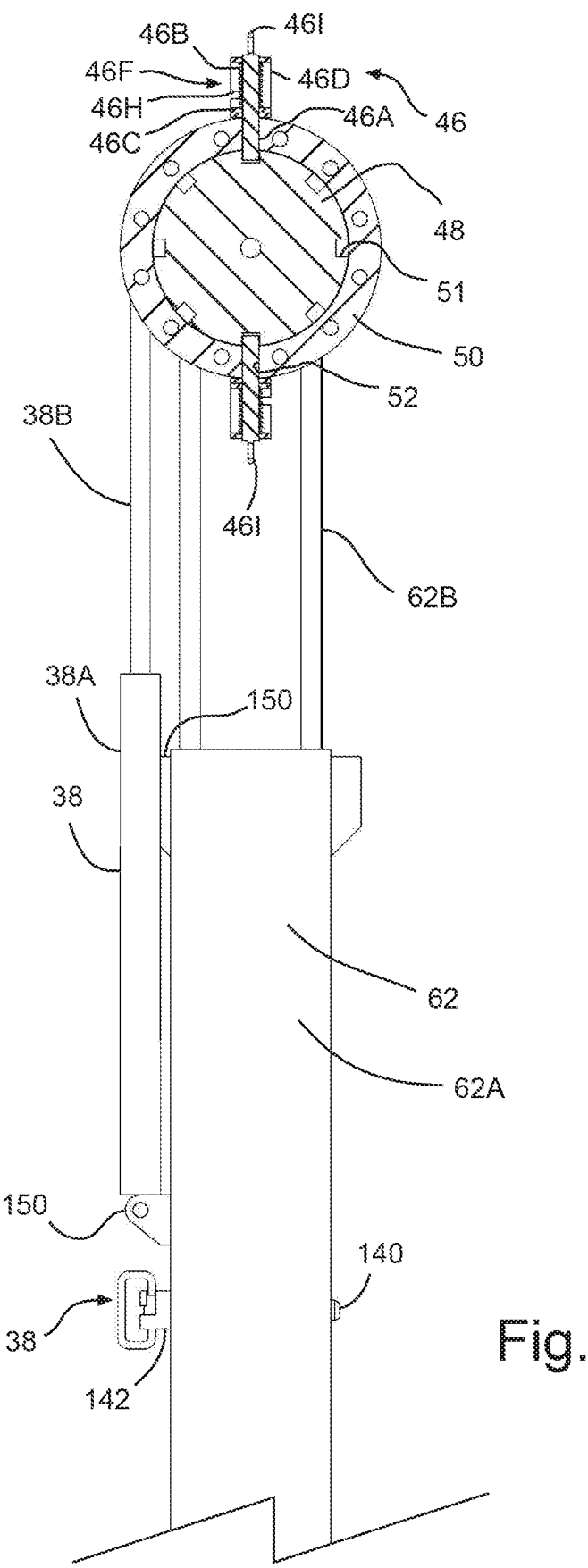
FIG. 18 is a partial section view taken along the 18-18 section lines from FIG. 16.

Referring to FIGS. 17 and 18 the cylinder 38 may be mounted between the members 16 and the frame 12 via a suitable mechanism. The cylinder body 38A may be mounted to column 62A via a part 151 of body 38A that is connected to column 62A, for example via a pin (not shown) or other rotatable or fixed connection. The piston rod 38B may be connected to inner column 62B, for example via a pin (not shown) or other suitable part. The pin may be concurrently received within holes 153 of the piston rod 38B and holes 155, for example of plates 152. Pins may be mounted via a retaining ring, bushing, bearing or other suitable part. Holes may refer to slots or channels in some cases.

Referring to FIG. 17, the ground engaging members 16 may be locked in one or both the laterally extended or retracted positions, via a lock 138. The lock 138 may have a suitable structure such as a locking pin 140, which may be received in use by aligned holes 148 of column 62A and one of holes 144 or 146 of column 62B depending on the position of the columns relative to one another. In the example shown the lock 138 may lock the members 16 in one, two or more lateral positions, for example two positions defined by respective pin receiving holes 144 and 146 in the example shown. The pin 140 may be received by pin boss 142, for example mounted to column 62A. The pin 140 may be biased into engagement or contact with the column 62B, and may be pulled out of contact with column 62B against the biasing force to unlock the column 62B.

Referring to FIGS. 3-4 and 7-9, the ground engaging members 16 may be configured to be steered about a range of angular positions, for example an incremental or infinite number of positions. In some cases the steerability of the members 16 permits the unit 10 to be driven in different directions, such as front, back, sideways, or at angles between front/back and sideways, such as forty five degrees. In some cases the steerability of the members 16 permits the members 16 to be stowed and deployed in different orientations. Referring to FIGS. 3-4 and 7-8A a range of two or more angular positions may include a first position where the ground engaging members 16 point in an axial direction 40. Steering may be accomplished using a manually adjusted mechanism, such as is shown in the drawings where a user performs all the steps required to rotate the members 16, for example while the members 16 are above the ground, or a driven mechanism that uses a motor or other drive source.

Figure 4:
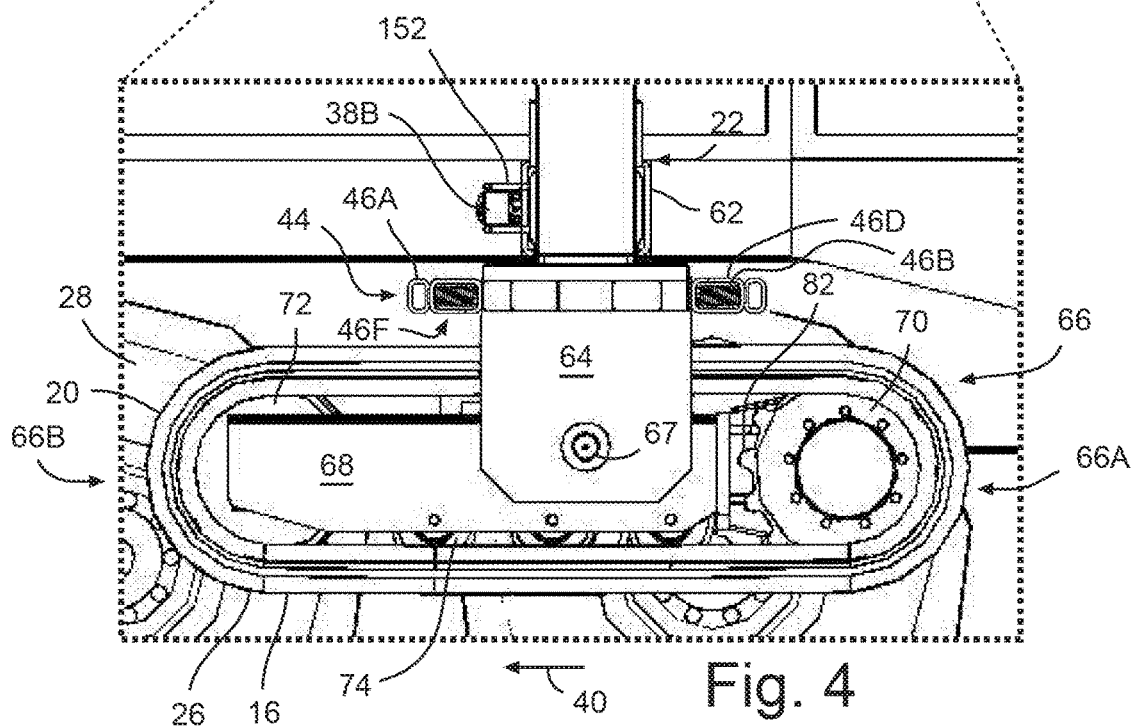
FIG. 4 is a close up view of the area delineated by dashed lines in FIG. 3.
Figure 5:
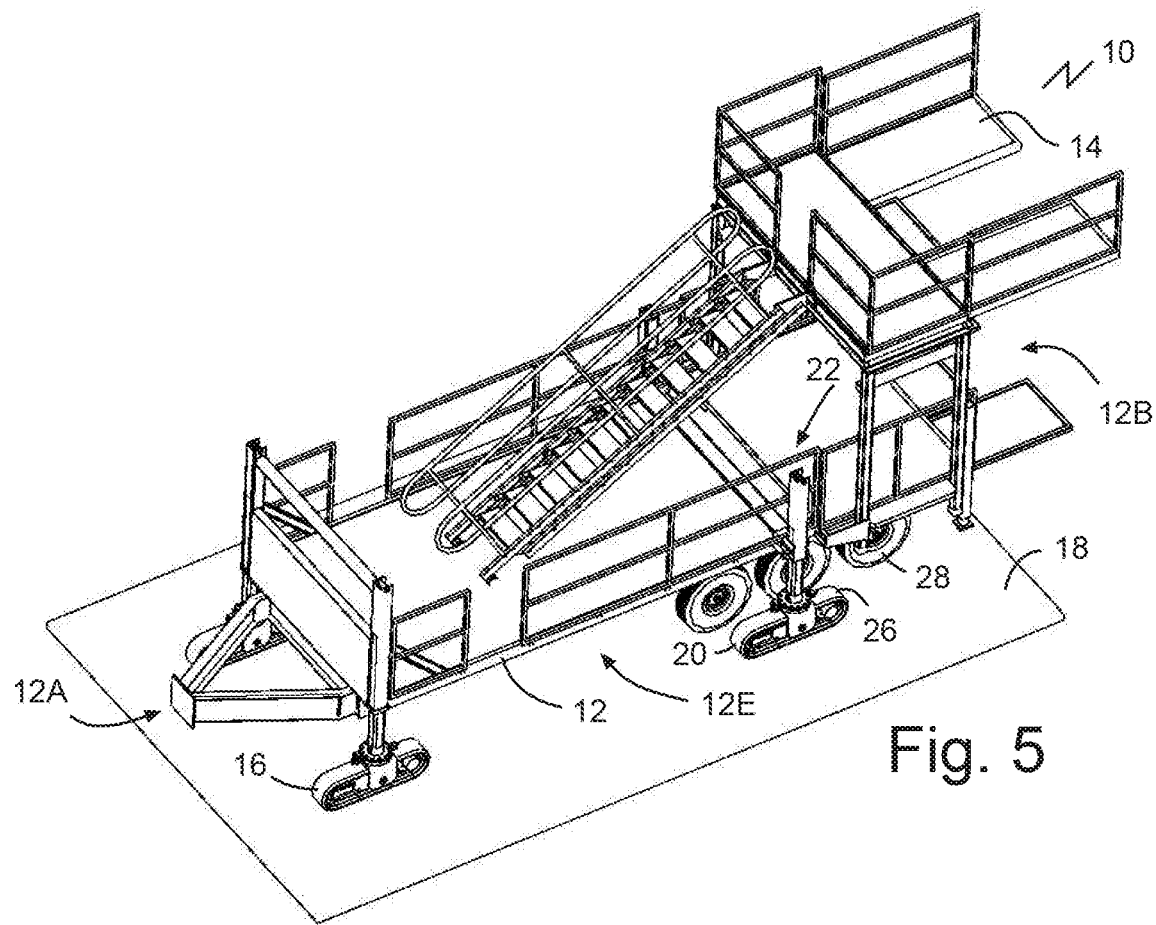
FIG. 5 is a perspective view of the mobile well service unit of FIG. 1 with ground engaging members in a lowered deployed position.
Figure 6:
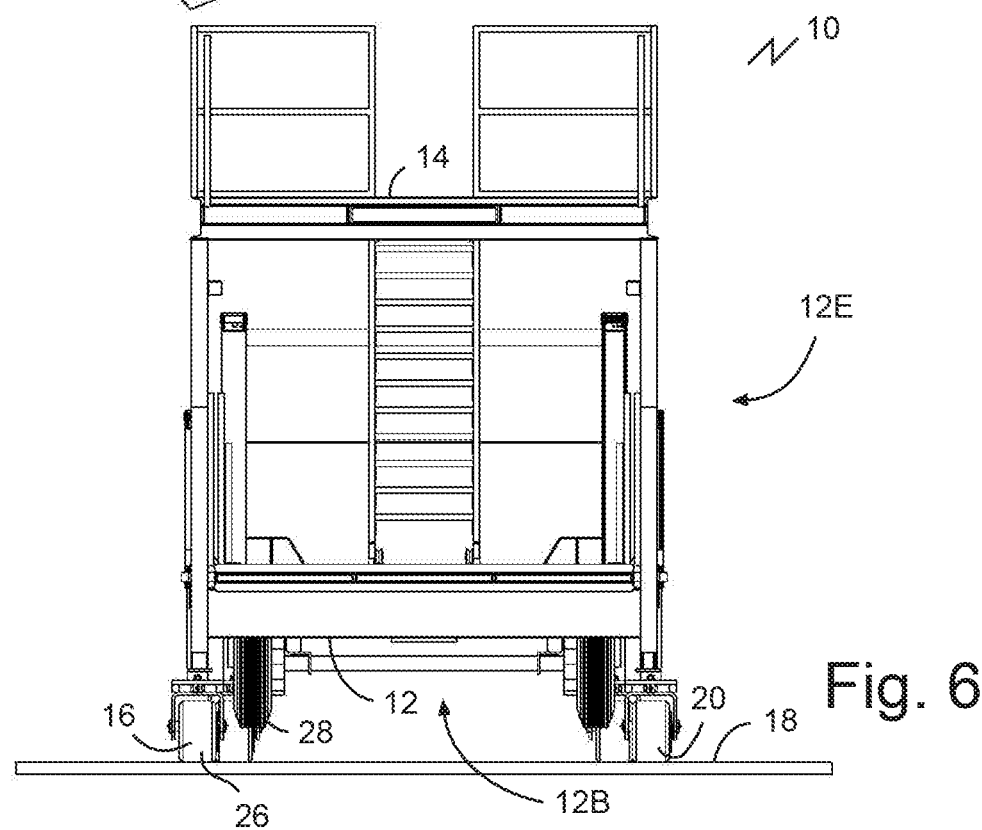
FIG. 6 is a rear elevation view of the mobile well service unit of FIG. 5.

Referring to FIG. 9, the range of angular positions may include a second position where the ground engaging members 16 point in a lateral direction 42, for example relative to the axis 12C, for example as illustrated in FIG. 9. For each ground engaging member 16, the range of two or more angular positions may include a plurality of positions where the ground engaging member 16 points in different respective lateral directions relative to the axis 12C. Each angular position refers to a different lateral direction in which the member 16 is pointed. Referring to FIGS. 3-4, and 9, the ground engaging members 16 may be configured to move, relative to the structural frame 12, between a) a raised stowed position, where the ground engaging members 16 are out of contact with the ground surface 18 and are in the first position, for example as illustrated in FIGS. 3-4, and b) a lowered deployed position, where the ground engaging members 16 contact the ground surface 18 and are in the second position, for example as illustrated in FIG. 9. Stowing the tracks 20 in an axial or other position and deploying in a lateral position may permit the tracks 20 to provide the unit 10 with a relatively smaller lateral footprint when the tracks 20 are stored at the sides of the unit as shown, whilst still permitting the tracks 20 to be deployed in a suitable orientation to drive the unit 10 laterally. Steering the members 16 may include rotating the members about an axis that has a vertical component, such as a vertical axis.

Referring to FIGS. 4, 8, and 16-17, the ground engaging members 16 may be lockable in a desired angular position. For example the members 16 may each comprise an angular locking system 44 to lock the ground engaging member 16 in a selected angular position of a range of angular positions. Referring to FIGS. 17-18, the angular locking system 44 may comprise a locking part 46, a first part 50, and a second part 48. The first part 50 may support the locking part 46 and be connected to the member 16. The second part 48 may be connected, for example directly or indirectly as shown, to the structural frame 12. The first part 50 may be mounted to rotate relative to the second part 48 to define the range of two or more angular positions. The second part 48 may define a plurality of slots 51 that align to receive the locking part 46 in different respective angular positions relative to the first part 50. The first part 50 may comprise a collar or other arcuate part, or a part that is configured to move about an arcuate path. The second part 48 may comprise a collar or disc, or other arcuate part, for example a disc as shown, or other part configured to move about an arcuate path. The second part 48 may be nested within the first part 48.

Referring to FIGS. 17 and 18, the locking part 46 may operate via a suitable mechanism. The locking part 46 may comprise a pin 46A biased to advance into contact with the second part 48, for example via a spring 46B that encircles the pin 46A. A pin 46C may mount the spring 46B to the pin 46A, by mounting within and extending out of a hole 46G of the pin 46A. The spring 46B may apply a pushing force on the pin 46A towards the second part 48, for example radially inward in the example shown. The locking part 46 may comprise a boss 46D that supports the pin 46A on the member 16. The boss 46D may receive the pin 46A via a hole 46E. The boss 46D may support the spring 46B and the pin 46C within an interior channel 46F in the boss 46D. A channel 46H in the boss 46D may be structured to receive the pin 46A, for example when the pin 46A is in a retracted position out of contact with the second part 48 and positioned radially outward relative to the second part 48. pulling and rotation of the pin 46A, to maintain the parts in an unlocked configuration and permit rotation of the member 16 into a different angular position. The disc or part 48 may be connected to rotate with column 162 via parts 172A. A retaining ring 176 may be mounted to the first part 50, for example via a plurality of bolts 186 or other suitable fasteners, to retain the second part 48 within an internal cavity defined by the ring 176 and part 50. To operate the locking part 46 a user may pull on and turn the pin 46A by grasping a handle 461 connected to the pin 46A. Upon releasing the handle 461 the pin 46A slides back into contact with the second part 48 via the action of spring 46B.

Referring to FIGS. 4, 8, and 16-17, the tracks 20 may have a suitable structure. Each ground engaging member 16 may be mounted to the frame 12 via an arm, such as column 62A. The tracks 20 may be connected to frame 12 via a bracket or jaw 64, for example via a pin 67. Referring to FIGS. 4, 17, and 19-20, each track 20 may include a track assembly 66, for example having one or more of a track frame 68, a drive wheel or sprocket wheel 70, a driven or non-powered wheel such as an idler wheel 72, and a road wheel or roller 74. The sprocket wheel 70, the idler wheel 72, and the roller 74 may be rotatably mounted to the track frame 68.

Figure 19:
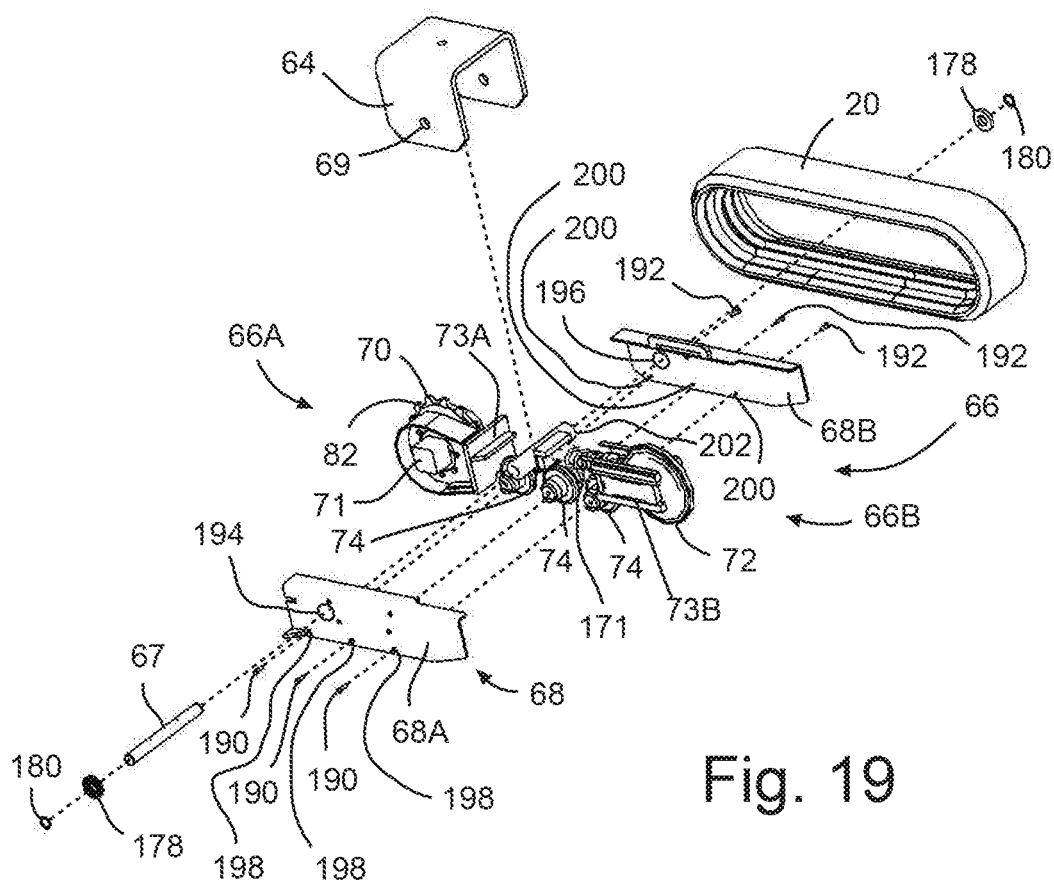
FIG. 19 is a first partially exploded view of a continuous track assembly of the mobile well service unit of FIG. 1.
Figure 20:
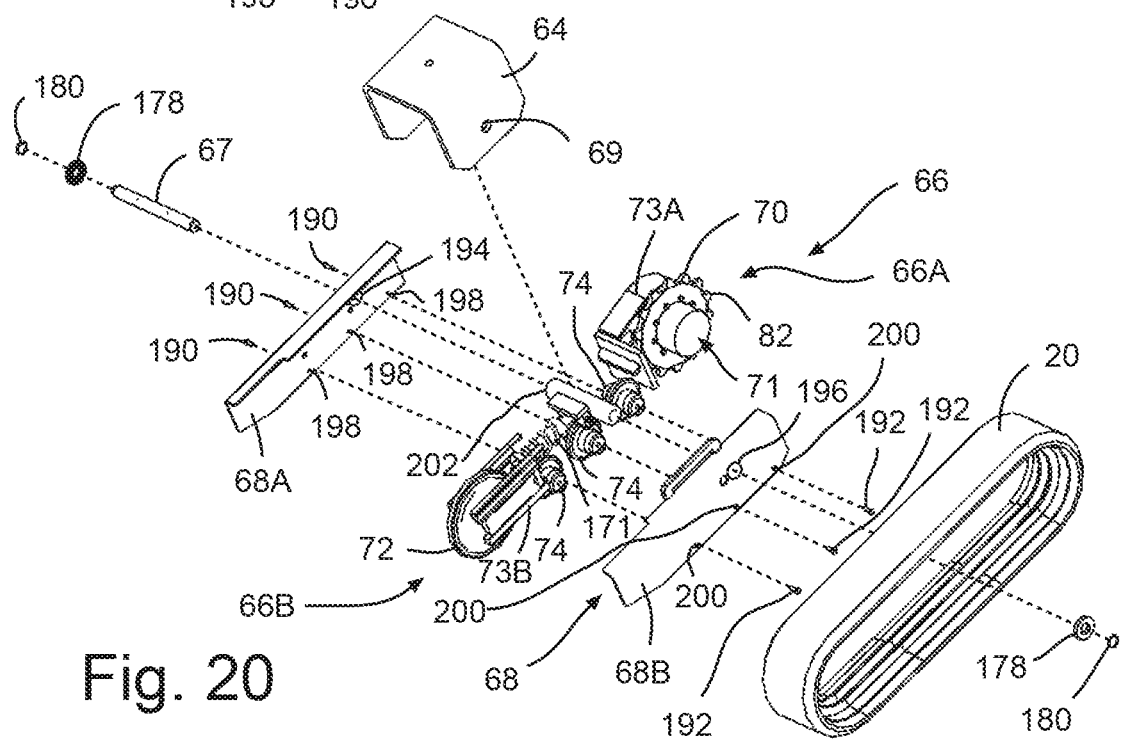
FIG. 20 is a second partially exploded view of the continuous track assembly of FIG. 19.

Referring to FIGS. 19-20, the track frame 68 may comprise a first part 68A and a second part 68B, for example that cooperate to mount and retain one or more of the sprocket wheel 70, the idler wheel 72, and the roller or rollers 74. The rollers 74 may be mounted to the first part 68A via screws 190 or other suitable fasteners, for example positioned within respective holes 198 in part 68A. The rollers 74 may be mounted to the second part 68B via screws 192 or other suitable fasteners, for example positioned within respective holes 200. The track assembly 66 may comprise any suitable number of wheels and rollers or one or the other. The track assembly 66 may comprise a part, such as a cylinder 202, for example structured to receive and mount the pin 67 and positioned within a hole 194 of the first part 68A and a hole 196 of the second part 68B.

Referring to FIGS. 19-20, the track assembly 66 may have a suitable system for maintaining sufficient tension in the track 20. For example, a shock absorbing spring strut 171 may be mounted on the frame 68 to apply a continuous force to separate the wheels 70 and 72 to apply tension on the track 20. The wheels 70 and 72 may be mounted on sub-frame parts 73A and 73B, respectively. The strut 171 or other biasing member may be mounted between parts 73A and 73B.

Referring to FIGS. 4, 17, and 19-20, the continuous track 20 may encircle the sprocket wheel 70, the idler wheel 72, and the roller 74 to form an endless loop. The continuous track 20 may comprise a continuous band of treads, for example rubber treads, or track plates, for example modular steel plates. Referring to FIGS. 4, 8, and 19-20, the sprocket wheel 70 may have a plurality of cogs or teeth 82, for example that engage the continuous track 20. Referring to FIGS. 16 and 19-20, the sprocket wheel 70 may be driven by a motor 71 or other suitable part or mechanism. Referring to FIGS. 4, 8, 16-17, and 19-20, the sprocket wheel 70 and the idler wheel 72 may be positioned at opposite ends 66A and 66B of the track assembly 66. The roller 74 may be positioned between the sprocket wheel 70 and the idler wheel 72. Referring to FIG. 17, one or more of a pin boss 178, a retaining ring 180, and a part 182 may be mounted to the jaw 64. Tracks 20 may be useful particularly on soft ground surfaces for obtaining the required traction to move the unit 10. Wheels may be used instead of tracks, although in some cases tracks have a relatively smaller height than suitable comparable wheels.

Referring to FIG. 9, the mobile well service unit 10 may have a platform 100, and associated structure suitable for providing workers with elevated access to the oil or gas well 56. The platform 14 may comprise a plurality of platforms, such as an upper platform 100 and a lower platform 98. The platform or platforms 14 may be mounted on a mast 88 with a first frame part 90 and a second frame part 92. The first frame part 90, for example comprising columns 94, may be mounted on the rear end 12B of the structural frame 12. The first frame part 92 may mount the lower platform 98, for example with a pair of columns 94 on each side 12E of the structural frame 12. The second frame part 92, for example comprising columns 96, may support the upper platform 100, for example with a pair of columns 96 on each side 12E of the structural frame 12. The columns 96 may be mounted to slide up and down along the first frame part 90, for example by insertion of base ends 96A of columns 96 within top ends 94A of respective channels defined by columns 94. The columns 96 may nest within the columns 94. The first frame part 90 and the second frame part 92 may comprise four columns 94 and four columns 96, respectively. Cross beams 102 may connect each column 94 in a respective pair of columns 94. Actuators (not shown), for example hydraulic cylinders with cooperating cylinder and piston parts, may be used for sliding the top platform 100 up and down. The lower platform 98 may also slide up and down.

Referring to FIG. 15, during use an under surface 100A of the upper platform 100 may be vertically spaced a distance 104 from an upper surface 98A of the lower platform 98. Distance 104 may be sufficient to define a standing work area between the lower platform 98 and the upper platform 100. A standing work area may be of a sufficient height to permit an adult male of average height to walk freely around within the work area.

Referring to FIGS. 1, 9 and 11-14, the platform or platforms 14 may have a structure suitable for moving between retracted and deployed positions to facilitate a compact stowed travel configuration and flexible worker access to the oil or gas well 56, respectively. The platform 14 may comprise floor panels, such as panels 106 and 108, mounted to move between an extended position, for example as illustrated in FIGS. 11 and 14, and a retracted position, for example as illustrated in FIGS. 9 and 12-13, toward or away from the oil or gas well 56 adjacent the platform 14 in use. The floor panels 106 and 108 may be configured to provide worker access to various parts of a Christmas tree 57, for example valves, gauges, or other suitable parts, a well head, or other suitable structures of an oil or gas well.

Referring to FIGS. 1, 3, 5-6, and 9-10, the lower platform 98 and the upper platform 100 may each comprise a set of floor panels, for example a set of lower floor panels 106 and a set of upper floor panels 108, respectively. Each floor panel 106 and 108 may be mounted to move independently relative to the other floor panels of the respective set of floor panels 106 and 108, for example between a retracted position, for example as illustrated in FIGS. 9-10, and an extended position, for example as illustrated in FIGS. 1, 3, and 5-6. Referring to FIG. 9, each floor panel 106 and 108 may be mounted to slide in a forward direction 110A and a rearward direction 110B parallel to the axis 12C of the structural frame 12. In the extended position, the floor panels 106 and 108 may form weight-bearing cantilevers. Floor panel extension and retraction may be controlled via a suitable actuator (not shown). Floor panels may move in lateral directions.

Referring to FIGS. 1 and 2, each set of floor panels 106 and 108 may have suitable configurations made up of a plurality of panels each. The set of floor panels 106 may comprise a first side panel 106A, a central floor panel 106B, and a second side floor panel 106C. The set of floor panels 108 may comprise a first side panel 108A, a central floor panel 108B, and a second side panel 108C. The central floor panels 106B and 108B may have shorter lengths than the first side floor panels 106A and 108A and the second side floor panels 106C and 108C. Thus, in the extended position, the floor panels 106 and 108 may define a well gap 112. In some cases, one or more panels 106 and 108 are moved to the retracted position when accessing the oil or gas well 56 via the mobile well service unit 10, for example to adjust the shape of the well gap 112 to accommodate obstructions or protrusions located at the oil or gas well 56.

Referring to FIG. 2, the floor panels 106 and 108 may be mounted to the respective platforms 98 and 100 via a suitable mechanism. The floor panels 106 and 108 may be mounted to slide within axial channels 120 defined by rails 114. The rails 114 may be I-beams 116, C-beams 118 or other suitable parts.

Referring to FIGS. 1 and 9, the platform 14, such as upper platform 100, may have a structure suitable for enhancing worker safety. Referring to FIG. 1, the upper platform 100 may comprise safety railings 122. The railings 122 may comprise side railings 124, for example mounted to the first and second side floor panels 108A and 108C, and front end railings 126, for example mounted to a front end 100B of the upper platform 100. Railings 122 may partially or fully enclose a working portion 128. A lateral gap 130 may be defined between front end railings 126 to provide access to upper platform 100 via a staircase 132. Prior to retraction of the first and second side floor panels 108A and 108C, side railings 124 may be removed.

Referring to FIGS. 1, 3, and 9-10, the mobile well service unit 10 may have a structure suitable for providing worker access to the upper platform 100. Referring to FIGS. 3 and 10, the mobile well service unit 10 may comprise a staircase 132, for example that extends from a floor 12D of the structural frame 12 to the upper platform 100. The staircase 132 may comprise one or more of stairs 132A, an upper end 132B, for example pivotally anchored to the upper platform 100, a lower end 132C, for example mounted to slide along chassis 58, for example by mounting rollers 132D. Staircase 132 may comprise opposed side rails 132E, and opposed side rails 132F, the opposed side rails 132E and 132F mounted to pivot as the staircase 132 rotates with height changes in the upper platform 100. The opposed side rails 132E and 132F may be formed by C-beams, I-beams, or other suitable structural members. Each opposed side rail 132F may have a respective length sufficient to maintain a gap 132N between the opposed side rail 132F and the floor 12D of the structural frame 12 as the staircase 132 rotates with height changes in the upper platform 100. The staircase 132 may comprise safety railings 132M.

Referring to FIGS. 3 and 10, the stairs 132A of the staircase 132 may be self-levelling. As the upper platform 100 is elevated or lowered, the stairs 132A may automatically pivot relative to the opposed side stringers or rails 132E and 132F, for example to remain horizontal and permit use of the staircase 132 by workers when the upper platform 100 is at different elevations. Each stair 132A may comprise a respective pair of opposed flanges 132I, each flange 132I having two pivot points 132J and 132K. The opposed side rails 132E may be pivotally connected to the upper platform 100 via plates 132L. As the staircase pivots by the up and down action of the platform 100, the rails 132E and 132F move relative to one another and the rollers 132D slide along the chassis 58, pivoting the stairs 132A. Other mechanisms for levelling the stairs 132A may be used, for example mechanical, electronic, controller and sensor driven, and other suitable mechanisms. The stairs may be telescopic to increase and decrease in length during rising and lowering of platform 100.

Referring to FIG. 9, the mobile well service unit 10 may be transported, for example towed, to the first oil or gas well 56' via the truck or other suitable vehicle, travelling down a road or highway to the well site 17. After the mobile well service unit 10 is positioned at a suitable location, for example at a well site 17 adjacent an oil or gas well 56', the mobile well service unit 10 may be unhitched from the truck 60. In some cases, the mobile well service unit 10 is unhitched prior to positioning the mobile well service unit 10 adjacent the first oil or gas well 56'. Ground engaging members 26 may be used to position the unit 10 in some cases. The outriggers 84 may be extended to the ground surface 18, for example to stabilize the mobile well service unit 10 in a parked servicing position.

Positioning may be carried out using the second set of ground engaging members 28 (wheels 32) to advance an end of the structural frame 12, for example the rear end 12B of the structural frame 12, towards the first oil or gas well 56'. During positioning, the first set of ground engaging members 26 (tracks 20) may be out of contact with the ground surface 18. Positioning may comprise backing the trailer chassis 58 using a truck 60 connected to the front end 12A of the structural frame 12 until the rear end 12B is adjacent the first oil or gas well 56'.

Referring to FIG. 9, the upper platform 100 may be elevated to a height suitable for providing worker access to the first oil or gas well 56'. A worker may access the upper platform 100 via the staircase 132. Referring to FIG. 11, the floor panels 106 and 108 may be extended beyond the rear end 12B to facilitate worker access to the first oil or gas well 56'. In some cases, one or more floor panels 106 and 108 remain in the retracted or partially retracted position to avoid contact with obstructions or protrusions or equipment located at the first oil or gas well 56'. The floor panels 106 and 108 may be extended before or after elevating the upper platform 100 and before or after positioning the unit 10. The outriggers 84 may be extended to the ground surface 18 before or after extending the floor panels 106 and 108. The side railings 124 (FIG. 1) may be mounted to the upper floor panels 108A and 108C that are in the extended position, for example to enhance worker safety.

Referring to FIG. 11, once the unit 10 is positioned, the first oil or gas well 56' may be serviced, for example using equipment stored on the mobile well service unit 10. After servicing is complete, the railings 124 may be removed. The floor panels 106 and 108 may be retracted. The upper platform 100 may be lowered to a suitable elevation.

Referring to FIGS. 9 and 12-13, the mobile well service unit 10 may be moved or translated laterally across the ground surface 18 from the first oil or gas well 56' to the second oil or gas well 56". Translating may be carried out using the first set of ground engaging members 26. During translating, the second set of ground engaging members 28 may be out of contact with the ground surface 18. All members 16 may be pointed in the same direction as one another to facilitate translation. In other cases the unit 10 is moved by having some members 16, which may be driven or not, steer the unit 10 into position while other members 10, which may be driven or not, follow without steer, much like the front and rear wheels on a car. Permitting the unit 10 to be translated to the second well 56" may negate a need to involve the truck 60 to reposition the unit 10, which may be advantageous if the truck 60 is otherwise blocked from doing so by other equipment or infrastructure, and may be advantageous in general as operation is simplified and several steps are omitted, namely the steps of connecting the unit 10 to the truck 60, maneuvering the unit 10 by advancing, turning, and backing up the truck 60, and disconnecting the unit 10 from the truck 60.

Referring to FIG. 14, prior to, during, or after movement or translation of the mobile well service unit 10, the floor panels 106 and 108 may be extended to facilitate worker access to the second oil or gas well 56'. Prior to, during, or after extending the floor panels 106 and 108, the upper platform 100 may be elevated to a desired working height. The side railings 124 (FIG. 1) may be mounted to the side floor panels 108A and 108C, for example to enhance worker safety. The second set of ground engaging members 28 (wheels 32) may be used to increase or decrease the distance between the rear end 12B of the structural frame 12 and the second oil or gas well 56", for example prior to or after moving or translating the mobile well service unit 10. The members 26 (tracks 20) may be steered during translation to properly position the unit 10 adjacent the second well 56".

Referring to FIG. 14, the second oil or gas well 56" may be serviced, for example using equipment stored on the mobile well service unit 10. After servicing is complete, the railings 124 may be removed. Referring to FIG. 13, the floor panels 106 and 108 may be retracted. Referring to FIG. 1, the outriggers 84 may be retracted out of contact with the ground surface 18. The floor panels 106 and 108 may be retracted. The mast, if any, may be pivoted into a stowed position, and the unit 10 secured for road transport.

Prior to leaving the well site 17, the mobile well service unit 10 may be used to service additional oil or gas wells 56 located adjacent to the first and second oil or gas wells 56' and 56". Once servicing is complete, the structural frame 12 or the trailer chassis 58 may be hitched to the truck 60 or other suitable vehicle. The truck 60 may be used to tow the mobile well service unit 10 to a storage facility, other well sites, or other suitable locations.

Words such as horizontal, vertical, up, down, upper, base, top, lower, rear, front, and other words are intended to be relative and not limited to fixed meanings defined with respect to the surface of the earth, unless context dictates otherwise. The ends 12A and 12B may be reversed in some cases, such that the platform is at the front end, or the ends may simply be first and second ends on the frame, without reference to a front or rear end. The front end and rear end are defined by reference to a road direction of travel, which may be defined by the wheels 32 and/or the truck 60 but would be understood by a skilled worker in the field. The ability to move the unit 10 laterally relative to a direction of road travel increases the maneuverability and ease of use of the unit 10.

Connections and mounting of parts may be direct or indirect, for example through intermediate parts. A lateral movement has a horizontal component, for example is in the horizontal plane or a plane parallel to a plane defined by the ground engaging members 16 and/or ground surface in use. A lateral direction may form a non-zero angle with the axis 12C. The axis 12C may be parallel to and coaxial with a direction of road travel. Rollers, skids, skis, or other devices may be used instead of wheels or tracks.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The invention claimed is:

1. A mobile well service unit comprising:
a structural frame with a front end and a rear end, and defining an axis between the front end and the rear end;
a platform mounted at the front end or the rear end of the structural frame and configured to move up and down relative to the structural frame;
ground engaging members mounted to the structural frame and configured to permit the mobile well service unit to move laterally, relative to the axis, across a ground surface; and
in which the ground engaging members comprise continuous tracks.

2. The mobile well service unit of claim 1 in which the ground engaging members are configured to move, relative to the structural frame, between:
a raised stowed position, where the ground engaging members are out of contact with the ground; and
a lowered deployed position, where the ground engaging members contact the ground surface.

3. The mobile well service unit of claim 2 in which each of the ground engaging members comprises an actuator connected to move the ground engaging member between the raised stowed position and the lowered deployed position.

4. The mobile well service unit of claim 2 in which the ground engaging members are a first set of ground engaging members, and further comprising:
a second set of ground engaging members mounted to the structural frame and configured to permit the mobile well service unit to move in a direction parallel to the axis.

5. The mobile well service unit of claim 4 in which the second set of ground engaging members are configured to be:
in contact with the ground surface when the first set of ground engaging members are in the raised stowed position; and
raised above and out of contact with the ground surface when the first set of ground engaging members are in the lowered deployed position.

6. The mobile well service unit of claim 4 in which the structural frame comprises a trailer chassis configured to be towed by a truck.

7. The mobile well service unit of claim 1 in which the ground engaging members are a first set of ground engaging members, and further comprising:
a second set of ground engaging members mounted to the structural frame and configured to permit the mobile well service unit to move in a direction parallel to the axis.

8. The mobile well service unit of claim 1 in which the ground engaging members are configured to move laterally outward, relative to a center of gravity of the mobile well service unit, between a laterally extended position and a laterally retracted position.

9. The mobile well service unit of claim 8 in which each of the ground engaging members comprises an actuator connected to move the ground engaging member between the laterally extended position and the laterally retracted position.

10. The mobile well service unit of claim 1 in which the ground engaging members are configured to be steered about a range of two or more angular positions.

11. The mobile well service unit of claim 10 in which the ground engaging members are configured to move, relative to the structural frame, between:
a raised stowed position, where the ground engaging members are out of contact with the ground and are in a first angular position; and
a lowered deployed position, where the ground engaging members contact the ground surface and are in a second angular position.

12. The mobile well service unit of claim 10 in which the ground engaging members each comprise an angular locking system to lock the ground engaging member in a selected angular position of the range of two or more angular positions.

13. The mobile well service unit of claim 12 in which the angular locking system comprises:
a locking part;
a first part supporting the locking part and connected to the respective ground engaging member; and
a second part connected to the structural frame, the first part being mounted to rotate relative to the second part to define the range of two or more angular positions, the second part defining a plurality of slots that align to receive the locking part in different respective angular positions relative to the first part.

14. A method comprising:
positioning a mobile well service unit adjacent a first oil or gas well, the mobile well service unit comprising a structural frame with a platform mounted at an end of the structural frame adjacent to the first oil or gas well, the platform configured to move up and down relative to the structural frame;
moving the mobile well service unit laterally across a ground surface from the first oil or gas well to a second oil or gas well; and
in which moving is carried out using continuous tracks.

15. The method of claim 14 in which:
moving is carried out using a first set of ground engaging members; and
positioning is carried out using a second set of ground engaging members to advance the end of the structural frame toward the first oil or gas well.

16. The method of claim 15 in which:
during moving the second set of ground engaging members are out of contact with a ground surface; and
during positioning the first set of ground engaging members are out of contact with the ground surface.

17. The method of claim 15 in which:
the structural frame comprises a trailer chassis;
the second set of ground engaging members comprise wheels;
the end of the structural frame is a rear end; and
positioning comprises backing the trailer chassis using a truck connected to a front end of the structural frame until the rear end is adjacent the first oil or gas well.

18. The method of claim 17 further comprising, after moving the mobile well service unit to the second oil or gas well, towing the trailer chassis away from the second oil or gas well.

19. A mobile well service unit comprising:
a structural frame with a front end and a rear end, and defining an axis between the front end and the rear end;
a platform mounted at the front end or the rear end of the structural frame and configured to move up and down relative to the structural frame;
ground engaging members mounted to the structural frame and configured to permit the mobile well service unit to move laterally, relative to the axis, across a ground surface; and
in which the ground engaging members are configured to move, relative to the structural frame, between:
a raised stowed position, where the ground engaging members are out of contact with the ground; and
a lowered deployed position, where the ground engaging members contact the ground surface.

20. The mobile well service unit of claim 19 in which each of the ground engaging members comprises an actuator connected to move the ground engaging member between the raised stowed position and the lowered deployed position.

21. The mobile well service unit of claim 19 in which the ground engaging members are a first set of ground engaging members, and further comprising:
a second set of ground engaging members mounted to the structural frame and configured to permit the mobile well service unit to move in a direction parallel to the axis.

22. The mobile well service unit of claim 21 in which the second set of ground engaging members are configured to be:
in contact with the ground surface when the first set of ground engaging members are in the raised stowed position; and
raised above and out of contact with the ground surface when the first set of ground engaging members are in the lowered deployed position.

23. The mobile well service unit of claim 21 in which the structural frame comprises a trailer chassis configured to be towed by a truck.

24. A mobile well service unit comprising:
a structural frame with a front end and a rear end, and defining an axis between the front end and the rear end;
a platform mounted at the front end or the rear end of the structural frame and configured to move up and down relative to the structural frame;
ground engaging members mounted to the structural frame and configured to permit the mobile well service unit to move laterally, relative to the axis, across a ground surface; and
in which the ground engaging members are configured to move laterally outward, relative to a center of gravity of the mobile well service unit, between a laterally extended position and a laterally retracted position.

25. A mobile well service unit comprising:
a structural frame with a front end and a rear end, and defining an axis between the front end and the rear end;
a platform mounted at the front end or the rear end of the structural frame and configured to move up and down relative to the structural frame;
ground engaging members mounted to the structural frame and configured to permit the mobile well service unit to move laterally, relative to the axis, across a ground surface;
in which the ground engaging members are configured to be steered about a range of two or more angular positions; and
in which the ground engaging members comprise continuous tracks and in which the ground engaging members are configured to move, relative to the structural frame, between:
a raised stowed position, where the ground engaging members are out of contact with the ground and are in a first angular position; and
a lowered deployed position, where the ground engaging members contact the ground surface and are in a second angular position.

26. A mobile well service unit comprising:
a structural frame with a front end and a rear end, and defining an axis between the front end and the rear end;
a platform mounted at the front end or the rear end of the structural frame and configured to move up and down relative to the structural frame; and
ground engaging members mounted to the structural frame and configured to permit the mobile well service unit to move laterally, relative to the axis, across a ground surface;
in which the ground engaging members are configured to be steered about a range of two or more angular positions;
in which the ground engaging members each comprise an angular locking system to lock the ground engaging member in a selected angular position of the range of two or more angular positions; and
in which the angular locking system comprises:
a locking part;
a first part supporting the locking part and connected to the respective ground engaging member; and
a second part connected to the structural frame, the first part being mounted to rotate relative to the second part to define the range of two or more angular positions, the second part defining a plurality of slots that align to receive the locking part in different respective angular positions relative to the first part.

27. A method comprising:
positioning a mobile well service unit adjacent a first oil or gas well, the mobile well service unit comprising a structural frame with a platform mounted at an end of the structural frame adjacent to the first oil or gas well, the platform configured to move up and down relative to the structural frame;
moving the mobile well service unit laterally across a ground surface from the first oil or gas well to a second oil or gas well; and
in which:
moving is carried out using a first set of ground engaging members; and
positioning is carried out using a second set of ground engaging members to advance the end of the structural frame toward the first oil or gas well.

28. The method of claim 27 in which:
during moving the second set of ground engaging members are out of contact with a ground surface; and
during positioning the first set of ground engaging members are out of contact with the ground surface.

29. The method of claim 27 in which:
the structural frame comprises a trailer chassis;
the second set of ground engaging members comprise wheels;
the end of the structural frame is a rear end; and
positioning comprises backing the trailer chassis using a truck connected to a front end of the structural frame until the rear end is adjacent the first oil or gas well.

30. The method of claim 27 further comprising, after moving the mobile well service unit to the second oil or gas well, towing the trailer chassis away from the second oil or gas well.

* * * * *